US012694724B2

(12) United States Patent
Sinha et al.

(10) Patent No.:  US 12,694,724 B2
(45) Date of Patent:  Jul. 28, 2026

(54) APPARATUS AND METHOD FOR PROCESSING DATA TO IMPROVE OPERATION OF MOTOR VEHICLES

(71) Applicant: DynamoEdge Inc., Dover, DE (US)

(72) Inventors: Nidhi Sinha, Jaipur (IN); Barbara Bessolo, Carmel, IN (US); Justin Wolf, Bush Prairie, WA (US)

(73) Assignee: DynamoEdge Inc., Carmel, IN (US)

( * ) Notice: Subject to any disclaimer, the term of this patent is extended or adjusted under 35 U.S.C. 154(b) by 0 days.

(21) Appl. No.: 18/828,219

(22) Filed: Sep. 9, 2024

(65) Prior Publication Data

US 2025/0087028 A1     Mar. 13, 2025

Related U.S. Application Data

(60) Provisional application No. 63/537,241, filed on Sep. 8, 2023.

(51) Int. Cl.
| | |
|---|---|
| *G08G 1/096* | (2006.01) |
| *G06N 20/20* | (2019.01) |
| *G07C 5/00* | (2006.01) |
| *G08G 1/00* | (2006.01) |
| *G08G 1/0967* | (2006.01) |
| *G08G 1/0968* | (2006.01) |

(52) U.S. Cl.
CPC .............. *G07C 5/008* (2013.01); *G06N 20/20* (2019.01); *G08G 1/096708* (2013.01); *G08G 1/096811* (2013.01); *G08G 1/22* (2013.01)

(58) Field of Classification Search
CPC ............. G06N 20/20; G08G 1/096708; G08G 1/096811
See application file for complete search history.

(56) References Cited

U.S. PATENT DOCUMENTS

| | | | | |
|---|---|---|---|---|
| 2022/0237499 A1* | 7/2022 | Sengupta | ........... | G06Q 10/0635 |
| 2023/0194281 A1* | 6/2023 | Lane | ...................... | G06Q 10/20 |
| 2023/0237127 A1* | 7/2023 | Joshi | ................... | G06F 18/2113 |
| | | | | 706/12 |

OTHER PUBLICATIONS

Feng, Boyuan, et al. "Palleon: A runtime system for efficient video processing toward dynamic class skew." 2021 USENIX Annual Technical Conference (USENIX ATC 21). 2021 (Year: 2021).*

* cited by examiner

*Primary Examiner* — Scott M Tungate
(74) *Attorney, Agent, or Firm* — Michael A. Pugel

(57) ABSTRACT

A method and system include receiving current data values for a group of vehicles, each of the current data values being generated by vehicles in the group of vehicles, and retrieving data external to the group of vehicles. They further include processing the data using two or more machine learning algorithms to identify a set of selected data values based on current operation and processing the set of selected data values, using a first and second machine learning algorithm, to generate predicted efficiency values for each vehicle. They further include determining if a predicted efficiency value of a first vehicle in the group of vehicles is less than a predicted efficiency for a second vehicle in the group of vehicles, comparing operational characteristics of the first and second vehicle based on the determination, and providing a message in order to improve efficiency for the first vehicle based on the comparison.

16 Claims, 8 Drawing Sheets

APPARATUS AND METHOD FOR PROCESSING DATA TO IMPROVE OPERATION OF MOTOR VEHICLES

CROSS-REFERENCE TO RELATED APPLICATION

This application claims the benefit, under 35 U.S.C. § 119(e), of U.S. Provisional Patent Application 63/537,241, filed on Sep. 8, 2023, which is incorporated herein in its entirety.

TECHNICAL FIELD

The present disclosure generally relates to systems using data analytics as part of the operation of vehicular systems, and more particularly, to vehicular systems using data analytics and machine learning algorithms to predict present and future operational characteristics and provide operational improvements in order to improve the efficiency of the vehicular systems.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Data analytics and data science are among the hottest new technical achievements available to businesses today. Data analytics are found in almost all aspects of life, including media content recommendations, shopping, and sporting events, along with business and manufacturing activities. At its simplest level, data analytics can be heuristic, effectively "if this happens then do that type of outcome". However, at a far more complex level data analytics analyze a plurality of current and past data values in a system and perform complex algorithms involving aspects of artificial intelligence including machine learning techniques. It is the latter that has truly led to advancements in determining what to do next in a process or predicting when something, such as a defect in a process or product, is going to happen.

Modern complex data analytics often rely on several elements for proper use. A mechanism is required for collecting data values. These data values may be directly available, such as user inputs, or may be more indirectly available, such as values provided by sensors on electrical and/or mechanical devices. In many cases the data values are required to be transmitted to another device or to another location prior to being processed in a device. A processing device, such as a computer or server, is usually necessary to perform some type of process or algorithm to manipulate the data values into the developed outcome as part of the data analysis. Further, a data storage mechanism is needed to store current as well as past data values that may be used as part of the process or algorithm. Finally, a mechanism is required to convey the developed outcome to where it is needed for use.

Certain industries, such as transportation and manufacturing are now only beginning to utilize artificial intelligence and the data analytics that is made available by its use. The transportation industry represents 29 percent of all energy consumed in the United States in 2021, and the automotive industry is responsible for a significant portion of that. In particular, companies, such as shipping, delivery, home service companies, as well as government entities, that own, operate, and/or control fleets of vehicles can benefit greatly from data analytics and artificial intelligence. However, in many cases the volume of data that can be generated by a fleet of vehicles requires an enormous amount of processing resources in order to produce meaningful results in a timely manner. Applying artificial intelligence techniques to generate real time data analytics would create a significant advancement in the efficiency of the fleet vehicle operations.

Currently the common practice used with data analytics is to have an offline phase where a learning model is trained on a dataset of values, often past data values and, as a second step, the model is deployed into the data analysis process online to make predictions on new incoming data. Hence, the learning model is treated as a static object. In some cases, the learning model may be updated, but this typically requires returning to the offline phase mentioned above. Machine learning models are deployed in such a manner because although they're extremely robust, they are equally limited by the learning capacity of the model. To learn from new data, the model must be retrained from scratch and with lots of historical data points simulating different situations, consuming massive processing, and storage. Such an approach often does not work effectively with live or real-time data values when the data includes ever-changing characteristics.

Further, monitoring the operational efficiency of even a single vehicle in a fleet of vehicles at a level that can produce meaningful improvements to the operation of the vehicle requires a large amount of data both from the vehicle (e.g., from sensors) as well as external to the vehicle (e.g., environmental, geographical, circumstantial), particularly if the improvements are to be provided with a low time latency, such as in real-time or near real-time. In addition to the large amount of data that needs to be processed, the relationship of much of the data to the current and future operational performance of the vehicle is not always easily determined without time consuming analysis. Even some machine learning algorithms are not capable of identifying specific operational characteristics from the many possible characteristics that can be used by the operator of the system to improve and/or optimize future performance. As a result, there is a need for a mechanism which can process and analyze a large amount sensor data from multiple vehicles, along with external data for the vehicles, to improve overall vehicle performance efficiency by recommending actions that can be taken within a low time latency (e.g., in real-time or near real-time).

SUMMARY

It should be understood that the elements shown in the figures may be implemented in various forms of hardware, software, or combinations thereof. Preferably, these elements are implemented in a combination of hardware and software on one or more appropriately programmed general-purpose devices, which may include a processor, memory, and input/output interfaces. Herein, the phrase "coupled" is defined to mean directly connected to or indirectly connected with one or more intermediate components. Such intermediate components may include both hardware and software based components.

According to an embodiment, a method is described. The method includes receiving a set of current data values for a group of vehicles over a network, the group of vehicles operating in unison as a vehicle fleet, each of the current data values being generated by at least one of the vehicles in the group of vehicles, retrieving data external to the group of vehicles from at least one database, and processing the set of current data values and the received external data for the group of vehicles using at least two machine learning algorithms to identify a set of selected data values, the set of selected data values based on current operation of the group of vehicles. The method further includes processing the set of selected data values, using a first machine learning algorithm selected from the at least two machine learning algorithms, to generate a current predicted efficiency value for each vehicle in the group of vehicles, processing the current predicted efficiency value for the group of vehicles, using a second machine learning algorithm, to generate at least one future predicted efficiency value for each vehicle in the group of vehicles at a future point in time, and determining if one of the current predicted efficiency value and the at least one future predicted efficiency value of a first vehicle in the group of vehicles is less than one of the current predicted efficiency value and the corresponding at least one future predicted efficiency value for a second vehicle in the group of vehicles. The method additionally includes comparing at least one operational characteristic of the first vehicle and the second vehicle if it is determined that one of the current predicted efficiency value and the at least one future predicted efficiency value of the first vehicle is less than one of the current predicted efficiency value and the corresponding at least one future predicted efficiency value of the second vehicle and providing a message in order to improve efficiency for the first vehicle in the group of vehicles based on the comparison.

According to an embodiment, a system is described. The system includes a data input element, the data input element receiving a set of current data values for a group of vehicles over a network, the group of vehicles operating in unison as a vehicle fleet, each of the current data values being generated by at least one of the vehicles in the group of vehicles, the data input element further retrieving data external to the group of vehicles from at least one database. The system further includes an artificial neural network engine coupled to the data input element, the artificial neural network engine processing the set of current data values and the received external data for the group of vehicles using at least two machine learning algorithms to identify a set of selected data values, the set of selected data values based on current operation of the group of vehicles, the artificial neural network engine further processing the set of selected data values, using a first machine learning algorithm selected from the at least two machine learning algorithms, to generate a current predicted efficiency value for each vehicle in the group of vehicles and processing the current predicted efficiency value for the group of vehicles, using a second machine learning algorithm, to generate at least one future predicted efficiency value for each vehicle in the group of vehicles at a future point in time. The system additionally includes a data processing device coupled to the artificial neural network engine, the data processing device determining if one of the current predicted efficiency value and the at least one future predicted efficiency value of a first vehicle in the group of vehicles is less than one of the current predicted efficiency value and the corresponding at least one future predicted efficiency value for a second vehicle in the group of vehicles and comparing at least one operational characteristic of the first vehicle and the second vehicle if it is determined that one of the current predicted efficiency value and the at least one future predicted efficiency value of the first vehicle is less than one of the current predicted efficiency value and the corresponding at least one future predicted efficiency value of the second vehicle. The system also includes a data output element coupled to the artificial neural network engine and the data processing device, the data output element providing a message in order to improve efficiency for the at least one vehicle based on the comparison.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Figure 1:
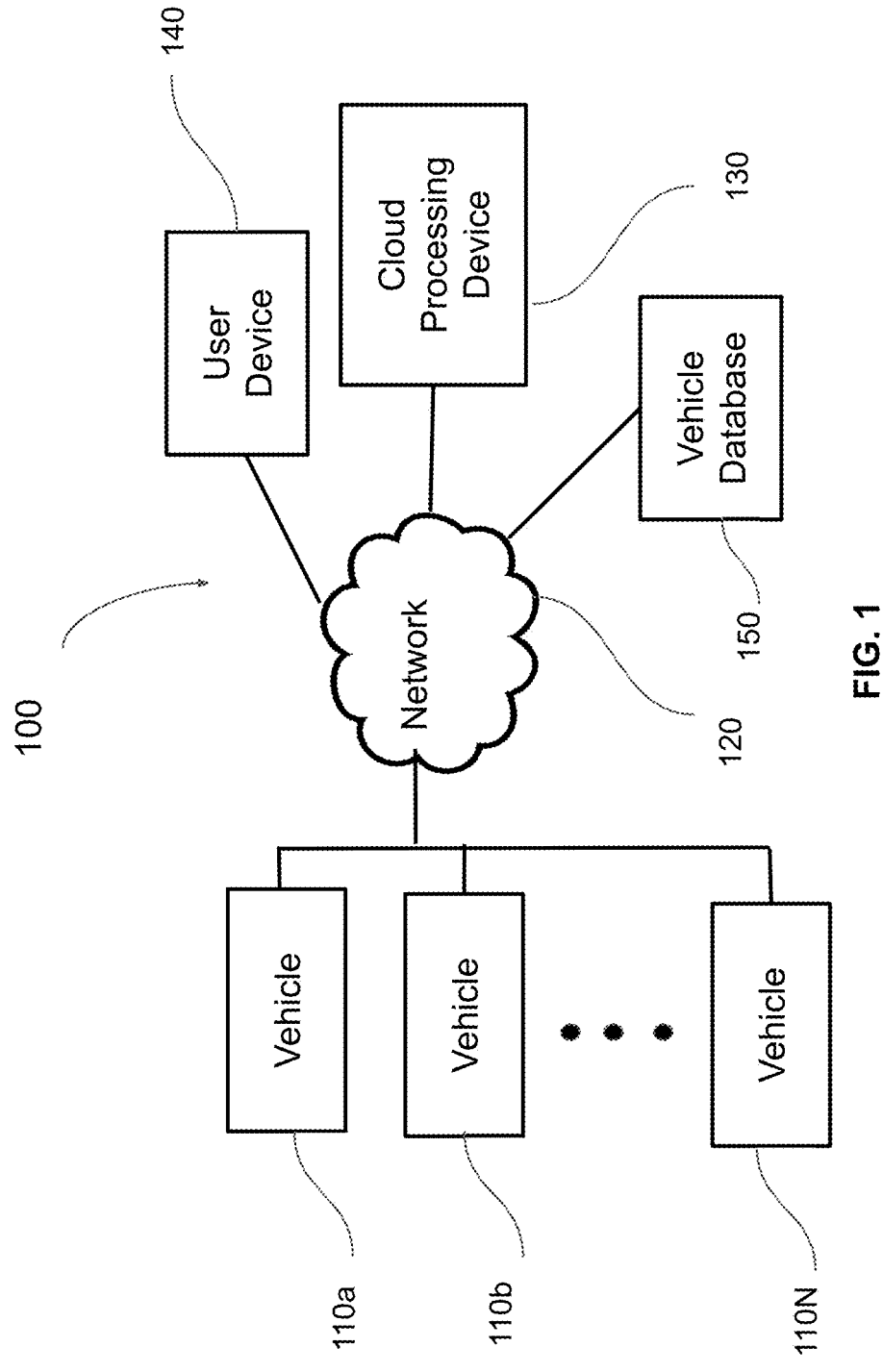
FIG. 1 is a block diagram of an exemplary system to which the principles of the present disclosure are applicable.

The present description illustrates the principles of the present disclosure. It will thus be appreciated that those skilled in the art will be able to devise various arrangements which, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative system components and/or circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor", "module" or "controller" should not be construed to refer exclusively to hardware capable of executing software, and may implicitly include, without limitation, a System on a Chip (SoC), digital signal processor ("DSP") hardware, read only memory ("ROM") for storing software, random access memory ('RAM'), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the embodiments hereof, any element expressed or described, directly or indirectly, as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present disclosure addresses issues associated with operational efficiency of vehicles that are used in transportation, manufacturing, or services industry or as part of providing government services. The operational efficiency may include, but is not limited to fuel efficiency, battery energy usage efficiency, and the like. In many cases, the vehicles used for these purposes are part of a vehicle fleet that is owned, operated and/or controlled by a company or government entity. The management of the operation of a fleet of motor vehicles, and the constant changing of operational characteristics of the vehicles, along with changing external conditions, such as environmental, geographical, and/or circumstantial conditions, can have a large effect on the operational efficiency of each individual vehicle in the fleet in many different ways. For example, driving characteristics, weather conditions, traffic conditions, and geographical location can be different for each vehicle as well as for each driver. The current solutions used to address and improve the operational efficiency of the vehicle fleet, while yielding some improvement, are typically based on a one size fits all analysis and are simply incapable of analyzing efficiency using the potentially large number of variables and converting that analysis into improvements for the operating conditions of specific vehicles. Further, the operational characteristics and external conditions are constantly changing, requiring analysis techniques and generation of improvements that have a low time latency between delivery of data for analysis and the production of useful results that can be used to improve operational efficiency of the vehicles.

The present disclosure addresses these issues by utilizing artificial intelligence structures, in the form of artificial neural networks, that apply specific or selected machine learning algorithms to process data received from each of the vehicles in the vehicle fleet, along with data for external conditions (e.g., environmental, geographical, and/or circumstantial conditions). The processing done by the machine learning algorithms is used to identify operational efficiency improvements for one or more of the vehicles by predicting current and future operational efficiency performance based on the evaluation of certain types of data values (e.g., vehicle data and/or data external to the vehicle) and comparing the vehicle operational characteristics that result from these data values to generate notifications that include improvements in the way the vehicle is operated. The improvements can be identified and implemented even in very brief time periods of operation as a result of a low time latency between generation of the values used and the production of outcomes or results in the artificial intelligence structures. Further, one or more of the operations to identify the improvements, as well as the implementation of the improvements, may be carried out through an electronic communication mechanism automatically.

It is worth noting that the term motor vehicle, also referred to as vehicle, as used herein, means a machine or device that is put in motion, propelled, or drawn by mechanical power. Examples of motor vehicles may include, but are not limited to cars, trucks, semi-tractor trailers, bikes, trikes, and other multi-wheeled vehicles powered by internal combustion engines or motors that run on some form of fuel as its energy source, such as gasoline, diesel, hydrogen and the like. Examples of motor vehicles may further include, but are not limited to, cars, trucks, bikes, bikes, and other multi-wheeled vehicles powered by an electric, electrodynamic, magnetic, or electromagnetic motor that uses a different type of energy source, including a renewable fuel source, such as chemical, electrochemical, solar, wind, and the like. These motor vehicles, or vehicles, may be used, but are not limited to use, on public streets, roads, or highways. As such, additional examples of motor vehicles may also include boats and other maritime motor vehicles as well as airplanes and other aeronautical motor vehicles.

Referring now to FIG. 1, a block diagram of an exemplary embodiment of a system 100 associated with data analysis and analytics according to aspects of the present disclosure is shown. System 100 may be incorporated into any operational electromechanical system or device that can benefit from and utilize data analytics to improve operation. Such a system may be utilized in conjunction with moving vehicles, manufacturing equipment, safety equipment, or electronic devices, such as computers, televisions, gateways, and the like. System 100 includes a plurality of vehicles 110*a*-110N. Vehicles 110*a*-110N are coupled to a network 120. The network 120 is further coupled to a cloud processing device 130 as well as a user device 140. The network 120 is further coupled to vehicle database 150. It is worth noting that some elements necessary for operation of a complete system similar to what is shown in FIG. 1 are not shown as they are well known to those skilled in the art.

Vehicles 110a-110N may be part of a vehicle fleet owned, operated, and/or controlled by one or more companies that utilize vehicles as part of business operations. In some embodiments vehicles 110a-110N may be operated and/or controlled by a government entity for the purpose of carrying out various government activities. As described above, one or more vehicles 110a-110N may primarily use petroleum or gas combustion engines in order to provide the motive force needed for the vehicle to move from location to location. In some embodiments, one or more the vehicles 110a-110N may include battery operated electric motors that replace or augment the motive force operation of the vehicles, often referred to as electric vehicles or hybrid vehicles. The vehicles may be completely under the operational control of a user who is present in the vehicles. In some embodiments, some or all of the operational control may be performed using automation based on one or more processors or computers internal to the vehicle. In still other embodiments, some or all of the operational control may be performed remotely, by one or both of a user and a processor or computer. Examples of vehicles 110a-110N include, but are not limited to, trucks, sport utility vehicles, sedans, vans, semi-tractors, and the like. In many embodiments, the vehicle fleet may include one or more of the different examples of vehicles. Each of the vehicles 110a-110N includes a plurality of sensors (not shown). Some or all of the sensors may provide an electrical or electromechanical interface to a portion of a separate operational system or device (not shown) to which the data analytics will be applied. Examples of sensors that may be used include, but are not limited to, pressure sensors, load sensors, temperature sensors, rotational sensors, vibrational sensors, chemical sensors, activity sensors, and the like. Additional details regarding the operation of sensors on a vehicle will be described below.

The sensor data from vehicles 110a-110N is provided to the cloud processing device 130 over network 120. In some embodiments, one or more of the sensors in vehicles 110a-110N may provide data values continuously while other sensors may provide data values in a periodic manner. In some cases, one or more of the sensors may provide data values only when requested to. Further, each one of the sensors may include a network interface for communicating data values from those sensors through each of the vehicles 110a-110N using network 120. The network interface for each one or more of sensors 110a-110N may be the same or may be different and may include a wired communication connection to other elements in vehicles 110a-110N or a short range wireless communication connection. In some embodiments, a secondary network interface may be included to aggregate all communications from each one of sensors within the vehicles 110a-110N prior to providing the aggregate of data values over network 120.

In addition to the sensor data from vehicles 110a-110N, additional data for one or more of the vehicles 110a-110N is provided from vehicle database 150 to the cloud processing device 130 through network 120. The additional data provided from the vehicle database 150 may include, but is not limited to, geographical location data, weather conditions and forecasts at the location of the vehicle, time of day and time of year at the location of the vehicle, type of vehicle, age of the vehicle, maintenance schedule for the vehicle, and the like. In some embodiments, some of the additional data may be generated specifically by the owner of the vehicle or by the provider of the service and, as such, may be considered proprietary. In some embodiments, the additional may be created or accessed from other databases or services based on data provided from the vehicles 110a-110N (e.g., from one or more sensors included on vehicles 110a-110N). For example, geographic and/or topographic information as well as road maps may be retrieved through a third party service using the global positioning system data from sensors on vehicles 110a-110N.

Network 120 may include one or more communication mediums (e.g., wired, wireless) and may further encompass multiple types of networks using multiple communication mediums that may all be interconnected. One or more of these multiple types of networks may be connected through the internet. Some or all of network 120 may be one or more private or local networks using proprietary network protocols. Additionally, or alternatively, some or all of network 120 may be public or standardized networks, such as cellular networks using a 3G, 4G, or 5G wireless protocol. In an embodiment, a portion of network 120 is a cellular network that operates in compliance with the 5G wireless protocol. Network 120 facilitates the transfer of the data values from the vehicles 110a-110N, as well as the vehicle database 150, to the cloud processing device 130, which is more capable of processing the aggregate of data values to predict an outcome for a requested result, characteristic, or notification associated with the vehicles 110a-110N. using artificial intelligence techniques. It is worth noting that in order to enhance the processing effectiveness of the artificial intelligence techniques described in the present disclosure, networks that have lower latency as well as reasonably high data throughput are favored over networks that either have low latency and low throughput or high latency and high throughput for use as network 120.

Cloud processing device 130 provides the signal and data processing capabilities and storage needed for generating predictive outcomes using the current data values from vehicles 110a-110N as well as external data values for vehicles 110a-110N from the vehicle database 150. Cloud processing device 130 includes a network interface for connecting to the network 120 along with one or more type data storage for maintaining the predictive outcomes and any necessary intermediate values during processing as well as storing past data values from the vehicles 110a-110N and vehicle database 150. In particular, cloud processing device 130 includes specific data processing structures necessary to capture, correlate, and analyze the data values and further include specific artificial intelligence structures, referred to as artificial neural networks (ANNs), that are employed as part of the processing perform to generate the predictive outcomes from the data values. ANNs are a type of machine learning model that have been used to perform a wide variety of complex tasks including, but not limited to, image recognition, speech recognition, pattern recognition, and detection of anomalies. An ANN is a biologically inspired algorithm that learns from training data. An ANN can be realized through software, hardware, or a combination of software and hardware. The structure of an exemplary ANN has a series of layers, each comprising one or more neurons arranged in one or more neuron arrays. In an exemplary embodiment, a neuron may comprise a register, a microprocessor, and at least one input. Each neuron produces an output, or activation, based on an activation function that uses the outputs of the previous layer and a set of weights as inputs. Each neuron in a neuron array may be connected to another neuron via a synaptic circuit. A synaptic circuit may include a memory for storing a synaptic weight. An exemplary ANN may be a Deep Neural Network having an input layer, an output layer, and a plurality of fully connected hidden layers. ANNs are particularly useful in anomaly detection because they can effectively extract features in linear and nonlinear relationships. In some embodiments, an ANN may be implemented by an application-specific integrated circuit (ASIC). ASICs may be specially customized for a specific artificial intelligence application and provide superior computing capabilities and reduced electricity consumption compared to traditional CPUs.

The ANNs can be configured to implement one or more machine learning algorithms that can be used to evaluate and process the data values from the vehicles 110a-110N along with the external data from the vehicle database. In some embodiments, different machine learning algorithms may be implemented at the same time. For example, one machine learning algorithm may be implemented to predict current outcome values (e.g., efficiency of vehicles 110a-110N) while a second machine learning algorithm may be implemented to predict future outcome values. Examples of machine learning algorithms that may be implemented include, but are not limited to, real-time multivariate machine learning algorithms, modified linear regression algorithms, dynamic linear regression algorithms, autoregressive integrated moving average (ARIMA) algorithms. Most machine learning algorithms require training in order to properly generate or predict outcomes. The training data may be generated by storing historical data values received from the vehicles 110a-110N and stored in either cloud processing device 130 or vehicle database 150. The length of time for the historical data may vary among the machine learning algorithms. In one embodiment, 30 minutes of historical data values may be stored. The machine learning algorithm(s) implemented in the ANNs is then trained using any known training techniques to generate data values and/or outcomes that can be compared to the current data values and/or outcomes, with the model parameters for the algorithm(s) adjusted as needed.

The use of ANNs to generate productive outcomes, such as efficiency values and recommendations to improve efficiency of a fleet of vehicles 110a-110N realizes a number of improvements over traditional methods of improving efficiency, including the ability to provide a more accurate assessment of efficiency of the vehicles, individually or in the aggregate, by using a large amount of data values both from the vehicles 110a-110N as well as data external to the vehicles 110a-110N, not easily handled by ordinary computer processing units. Additionally, the ANNs can provide both the efficiency results and vehicle specific recommendations for efficiency improvement with a low time latency from receiving the data values. In some cases, the results and recommendations may be provided in real-time or near real-time.

Cloud processing device 130 may further include various other local interfaces for connecting auxiliary equipment, such as keyboards, display monitors, and the like. Cloud processing device 130 may be embodied as a cloud server, a multi-edge computer server, a desktop computer, a mainframe computer, a cloud-native processor, a scalable processor, and the like.

User device 140 receives any output data from cloud processing device 130 and provides the output data through some form of user interface to an end user or service operator. One of the primary outputs from cloud processing device 130 may be the outcome for a requested result or characteristic based on an analysis of data (e.g., data from vehicles 110a-110N and vehicle database 150). For example, one of the outcomes may be a prediction of pressure change of a tire on one of vehicles 110a-110N. Another outcome may be the prediction of a point in time, or miles traveled in the future when the tire may be less than the lowest recommended operating pressure for the tire that is provided to the user and the number of miles until the tire pressure is critically low. Other examples of output data from cloud processing device 130 may include efficiency values and improvement opportunities for the fleet of vehicles 110a-110N as well as environmental information, such as carbon footprint and carbon credit opportunities. User device 140 may include various user interface elements, including, but not limited to, a display screen, audio device, keyboard, mouse, cursor controller, microphone, and the like. User device 140 may be embodied as a desktop computer, a laptop computer, a tablet computer, and mobile phone, and the like. It is worth noting that, in some embodiments, some or all of the structure and functions of user device 140 may be included as part of cloud processing device 130. For example, cloud processing device 130 may include a display for displaying information as well as a keyboard and/or cursor controller for entering user inputs to manipulate the display.

In operation, current data values are generated by each of the sensors in each of vehicles 110a-110N. Some or all of the current data values are provided over network 120 to cloud processing device 130. In addition, data external to vehicles 110a-110N is retrieved from database 150 and provided over network 120 to cloud processing device 150. The current data values and the data external to vehicles 110a-110N are processed in the cloud processing device using two or more machine learning algorithms to identify a set of selected data values. These selected data may be identified and selected based on the current operation, or driving characteristics, as well as environmental conditions of the vehicles 110a-110N. The set of selected data values are further processed using one of the two or more machine learning algorithms to generate a current predicted efficiency value for each of the vehicles 110a-110N. The current predicted efficiency value for each of the vehicles is further processed using a second machine learning algorithm to generate one or more future predicted efficiency values for each of vehicles 110a-110N. It is worth noting that the second machine learning algorithm may be different from the first machine learning algorithm and also may be different from the one or more algorithms used to identify the set of selected data values. Further, the one more future predict efficiency values may be values at points in time or may be values at points of distance traveled by the vehicle, such as miles.

A determination is made in cloud device 130 as to whether the current predicted efficiency value or a future predicted efficiency value, collectively a predicted efficiency value, of one or more of the vehicles 110a-110 is less than a current predicted efficiency value or future predicted efficiency value (i.e., predicted efficiency value) for one of the other vehicles from vehicles 110a-110N with the. If one or more of the vehicles 110a-110N is found to have a predicted efficiency value that is less than the highest predicted efficiency value, then a comparison is made between one or more operational characteristics for the one or more vehicles and the vehicle having the highest predicted efficiency value from vehicles 110a-110N. The cloud processing device 130 generates one or more efficiency improvements based on the comparison and provides the efficiency improvement(s) to either the one vehicle and/or the user device 140. The efficiency improvement(s) may be provided and displayed as a recommendation in a message or notification.

It is worth noting that the operator for each of the vehicles 110a-110N may implement the recommended efficiency improvement(s). In some embodiments, one or more of the efficiency improvements may be implemented automatically in vehicles 110a-110N in order to improve efficiency without human interaction. Further, the operation continues with receiving new data values and can monitor the effect of implementation of the efficiency improvements in vehicles 110a-110N as well as continue to provide further efficiency improvements for vehicles 110a-110N based on changing operational characteristics.

In another related operation, specific data values may be extracted from the set of current data values from vehicles 110a-110N and processed in a manner similar to that described above. For example, tire pressure values for each of the wheels on vehicles 110a-110N may be extracted and processed in cloud device 130, using or more machine learning algorithms implemented in the ANNs, to predict future tire pressure values. Tire pressure is a contributing factor to operational efficiency of vehicles 110a-110N, namely fuel efficiency or energy efficiency. The current and future predicted tire pressure values are compared to a threshold tire pressure value based on, for instance the recommended value for each of vehicles 110a-110N. If the current tire pressure or one of the future predicted tires pressures values is below the threshold pressure, then a notification is sent to address the tire pressure. The notification may indicate that the tire pressure should be addressed currently or at a point in time or mileage in the future based on the future predicted tire pressure values. Further, the current and future tire pressure values are used to determine if a rate of change of tire pressure value exceeds a threshold value. A high rate of change of tire pressure indicates a potential tire deflation and/or failure occurrence, resulting in a safety issue for the vehicle. If the rate of change of tire pressure exceeds the threshold value a safety alert may be provided. In some embodiments, the safety alert may be automatically implemented, such as by reducing the speed of the vehicle and/or preventing the vehicle from moving or running at all. Other examples may also be implemented in a manner similar to that described above.

In another operation, all of the outcomes from the above operations, such as predicted efficiency predictions, tire pressure predicted, as well as improvements, recommendations, and safety alerts, may be provided to user device 140 for display in a graphic user interface (GUI). The GUI on user device 140 may allow for user input to navigate and control the operations and elements of display on the GUI. The GUI may be generated using a program application, such as Grafana® or React Native.

The cloud processing device 130 is considered to be a network device that sits in the cloud portion of the network 120. As a result, cloud processing device 130 includes the capability to achieve and maintain low time latency associated with delivering data, such as the current set of values from sensors in vehicles 110a-110N, over the network 120 for processing at the cloud processing device 130. The low time latency is particularly important in systems where a large number of sensors and/or large number of vehicles 110a-110N may be generating data values and providing the data values over network 120. As an example, a typical vehicle 110a-110N may include 160 sensors capable of generating data values. Although in some cases data values from sensors in vehicles 110a-110N may be generated continuously, the generating and delivery of data values, such as the current set of values, is typically limited to being periodic in nature. The periodic rate of data delivery may be dependent on the required accuracy and update requirements for determining any predictive values as part of the machine learning algorithm that is identifying performance improvements and/or the point in time for the operational condition of a vehicle. In some embodiments, the delivery rate for the data may be four times per second.

It is worth noting that although some vehicles 110a-110N may include a large number (e.g., 160) of sensors. Some of these sensors do not generate data values that require further processing using machine learning algorithms implemented in the ANNs of cloud processing device 130. As a result, not all of the sensors may be used in conjunction with further processing in a machine learning algorithm. Instead, the data values from these sensors may be used for monitoring operations of vehicles 110a-110N. In some embodiments, a prioritization mechanism may be used as part of the specific program application for data ingestion in order to assign higher priority to data values from sensors that require further processing using machine learning algorithms. Such a prioritization mechanism may further ensure low time latency for the higher priority data values. Further, given the potential for a large amount of data to be provided from the vehicles 110a-110N in the fleet, each vehicle may provide an indication of a state of operation, such as moving or not moving. As a result, each of the vehicles 110a-110N may only initiate communication with the cloud processing device 130 over network 120 while indicating that it is in the moving state. Alternatively, each of the vehicles 110a-110N may deliver only a portion of the data generated from the sensors or deliver the data generated from the sensors at a lower delivery rate while indicating it is not in the moving state. For example, each of the vehicles 110a-110N may deliver only data values from sensors that have changed value or may deliver data values at a rate of one time per second instead of four times per second as described above.

In some embodiments, some or all of the results, including performance improvements as well as component operational condition predictions, may be communicated from the cloud processing device 130 over network 120 to the vehicles 110a-110N. In some cases, the results associated with one of the vehicles 110a-110N may be requested by the operator of that vehicle. In other cases, the information associated with a component operational condition prediction for a component may be automatically communicated and updated as needed, along with additional information associated with addressing the issue with the component.

In some embodiments, a high performance database interface application may be used. Additionally, a time efficient machine learning algorithm may be used for processing the data values. The requirement for low time latency is made necessary in applications that require rapid updates in order to process many vehicles simultaneously. Such low time latency associated with delivering data for processing may be referred to as real time or near real time delivery, processing, or updating.

Figure 2:
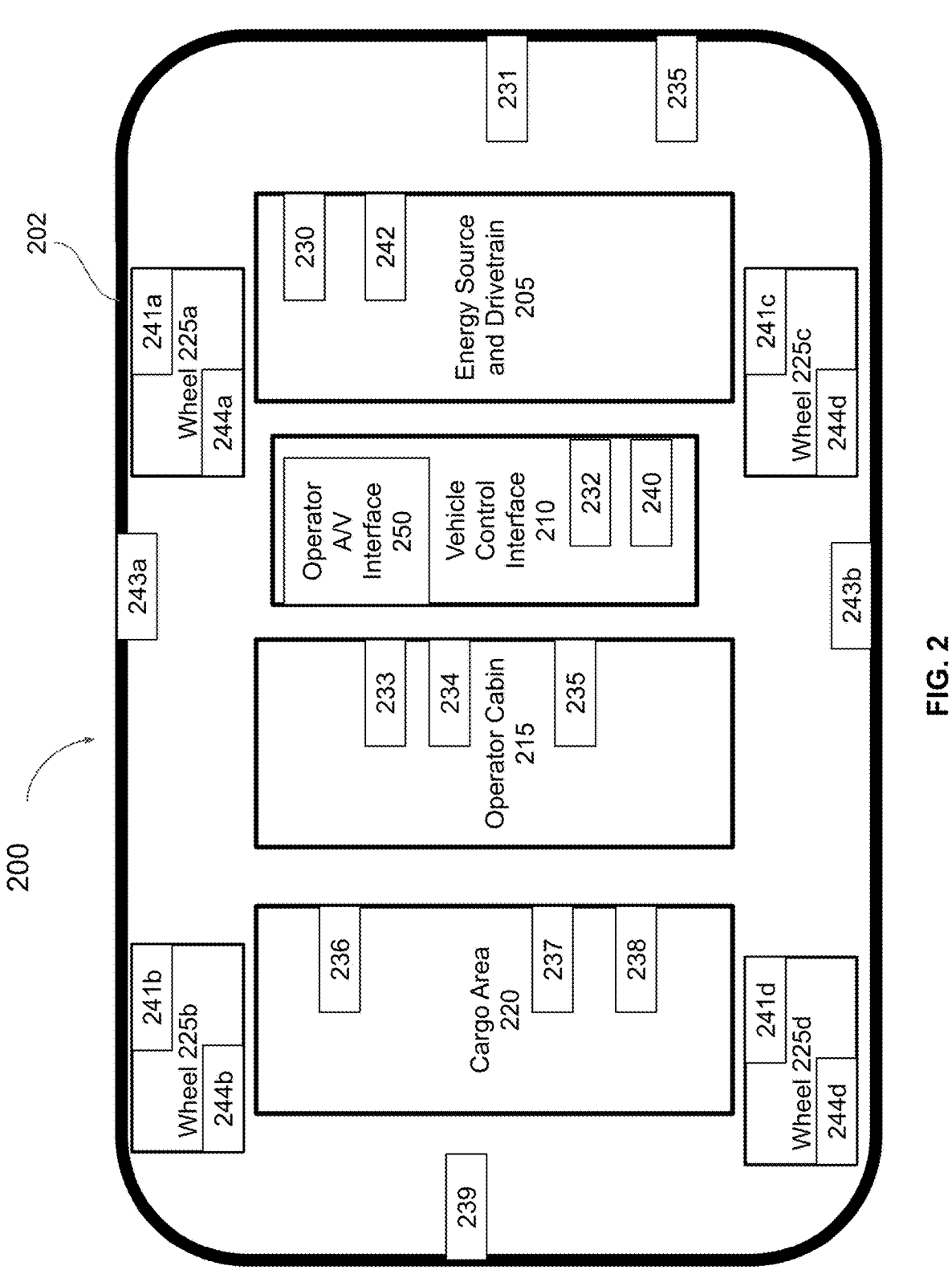
FIG. 2 is a diagram representing key elements of an exemplary motor vehicle to which the principles of the present disclosure are applicable.

Turning to FIG. 2, a diagram representing key elements of an exemplary motor vehicle 200 according to aspects of the present disclosure is shown. The motor vehicle 200 may be configured and operate in a manner similar to motor vehicles 110a-110N described as part of system 100 in FIG. 1. It is worth noting that the diagram in FIG. 2 shows a motor vehicle 200 in a diagrammatic representation rather than a structural one in order to illustrate a set of key elements associated with the structure and operation of motor vehicle 200. As such, motor vehicle 200 is not intended to show actual positions or locations of various elements that may be present in a motor vehicle or even show all elements that may be present or needed for operation. However, the principles discussed and applied to motor vehicle 200 may equally be applied to the many types of motor vehicles described above. Further, some operational aspects and components of motor vehicle 200 are not shown and will not be described here for the purpose of conciseness as they are well known to those skilled in the art.

The motor vehicle 200 includes an external structure 202, an energy source and drivetrain 205, a vehicle control interface 215, an operator cabin 215, and a cargo area 220. The motor vehicle also includes four wheels 225a-225d. Each of the elements may be interconnected using one or more types of mechanical and/or electrical mechanisms as are well known to those skilled in the art. Further, each of the elements includes one or more sensors, identified as sensors 230-244, that generate data values representative of a particular operational aspect of the element. The list of sensors 230-244, along with the element location, sensor type, and data type, is provided in Table 1 below:

sensors 230-244. The operational characteristics may include, but are not limited to, vehicle speed, engine temperature, amount of fuel or battery capacity remaining, and the like. The operator A/V interface 250 also provides an interface to external communication networks. The external communication networks may include, but are not limited to, broadcast radio and/or V networks, cellular phone networks, satellite communication networks, and the like. Specifically, operator A/V interface 250 provides a wireless interface to a communication network used to process the data values from sensors 230-244, such as network 120 described in FIG. 1. In this manner, specific outcomes from the cloud processing device 130, such as operational efficiency values and operational improvement recommendations, may be communicated to vehicle 200 as described above. In addition, instructions, in the form of software, control code, and updates may be communicated to vehicle 200 as needed, such as part of implementing an operational improvement.

It is worth noting that sensor 230-244 in motor vehicle 200 are only exemplary and representative of the sensors

TABLE 1

| Ref. Number | Element Location | Sensor Type and data type |
|---|---|---|
| 230 | Energy Source and Drivetrain 205 | Energy source and drivetrain monitor - data PIDs and linear values |
| 231 | External Structure 202 | Hood Status Sensor - binary |
| 232 | Vehicle Control Interface 210 | Driving Behavior Sensor - audio/video and linear values |
| 233 | Operator Cabin 215 | Seat Belt Status Sensor - binary values |
| 234 | Operator Cabin 215 | Driver Identification Sensor - audio/video values |
| 235 | Operator Cabin 215 | External Environment Sensor -audio/video values |
| 236 | Cargo Area 220 | Weight Sensor - linear values |
| 237 | Cargo Area 220 | Humidity Sensor - linear values |
| 238 | Cargo Area 220 | Temperature Sensor - linear values |
| 239 | External Structure 202 | Rear Door Status Sensor - binary values |
| 240 | Vehicle Control Interface 210 | Security Senor - binary values |
| 241a-241d | Wheels 225a-225d | Tire Pressure Sensor - linear values |
| 242 | Energy Source and Drivetrain 205 | Fuel Sensor - linear values |
| 243a-243b | External Structure 202 | Side Door Status Sensor - binary values |
| 244a-244d | Wheels 225a-225d | Wheel speed sensor - linear values |

Each of the sensors 230-244 may be affixed or otherwise incorporated into some type of electromechanical structure included as part of the element to which the sensor is included. Ideally the affixation or incorporation of the sensors with the electromechanical element has either a limited or no effect on operation or its effect is compensable by the element, system, or device. Further, one or more of the sensors 230-244 may include an electrical or electromechanical property or characteristic conversion mechanism. For example, wheel speed sensors 244a-244d may be rotational sensors used to measure the rotational speed of wheels 225a-225d, respectively. The sensors 244a-244d may include a conversion mechanism to translate mechanical rotation to an electrical voltage and further may include a mechanism to convert the electrical voltage to a digital signal. As another example, weight sensor 236 may be load sensor may include a conversion mechanism to translate mechanical force or pressure in cargo area 220 to an electrical voltage and/or into a digital signal.

The vehicle control interface 210 further includes operator audio/video (AN) interface 250. The operator A/V interface 250 allows the operator to interact with motor vehicle 200. The operator A/V interface 250 may display one or more current operational characteristics of motor vehicles based on settings implemented by the operator or data from that may be used on other vehicles in order to illustrate the concepts. In other embodiments, such as different motor vehicles, more or fewer sensors, as well as different types of sensors, may be present and/or used. Further, as described above, the data values provided from one or more of the sensors 230-244 may not be used in one or any of the processes described as part of the present disclosure.

Figure 3:
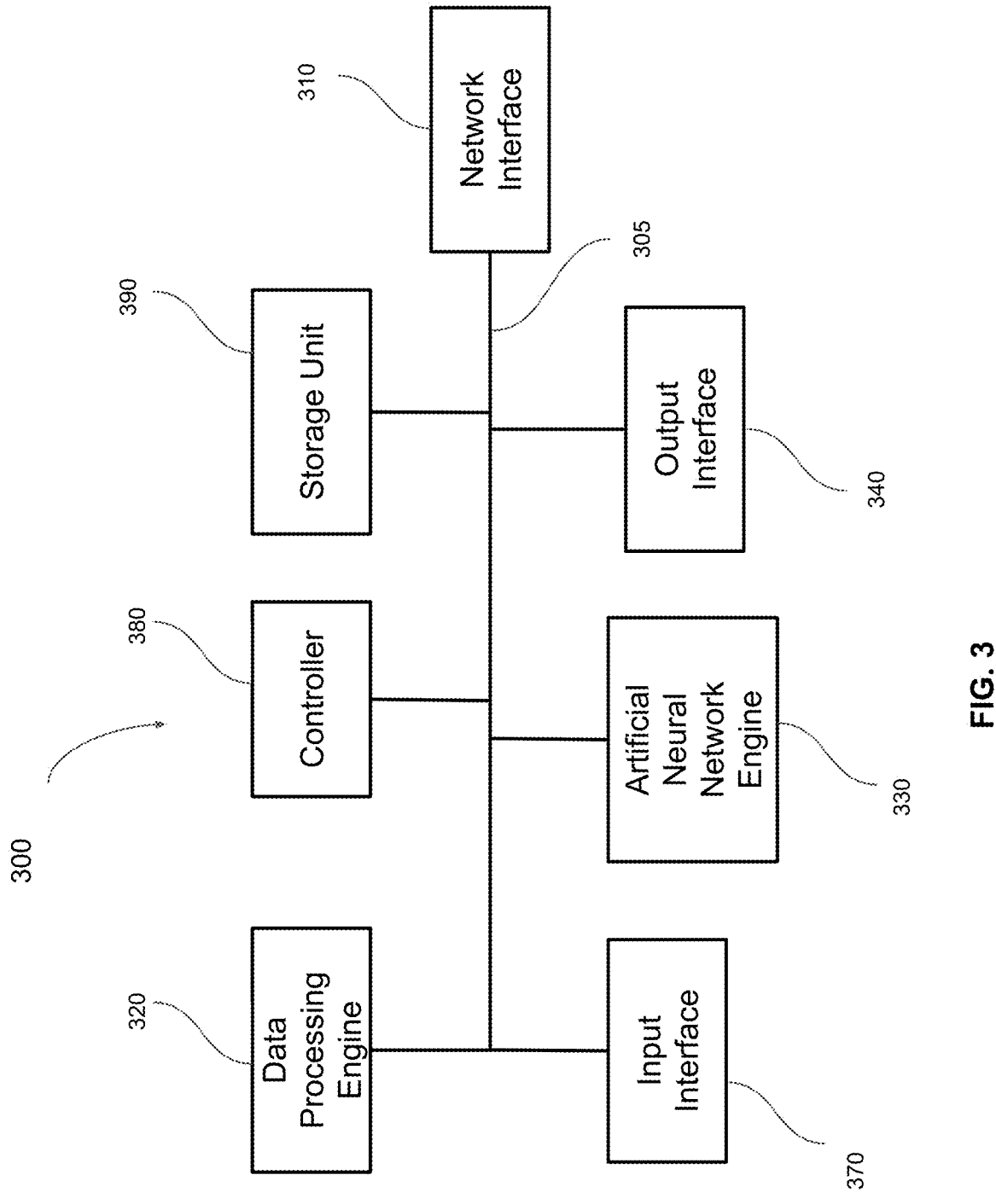
FIG. 3 is a block diagram illustrating an exemplary network device to which the principles of the present disclosure are applicable.

Turning to FIG. 3, a block diagram illustrating an exemplary network device 300 according to aspects of the present disclosure is shown. The network device 200 may operate in a manner similar to cloud processing device 130 described as part of system 100 in FIG. 1. Network device 300 may also be used in conjunction with other systems including, but not limited to manufacturing devices, safety equipment, agricultural systems, chemical systems, medical systems, and the like. Network device 300 includes a network interface 310, a data processing engine 320, an ANN engine 330, an output interface 340, a controller 380, and a storage unit 390 which are connected together electrically or otherwise coupled together by a communication bus 305. In some embodiments, one or more elements shown in network device 300 may be coupled together by a mechanism other than communication bus 305, such as a wired or wireless network as described above. It is worth noting that some elements necessary for operation of network device 300 are not shown as they are well known to those skilled in the art.

The network interface 310 provides an interface between the network device 300 and wide area network or WAN (e.g., network 120 described in FIG. 1). The network interface 310 may be communicable with the WAN via a wired or wireless communication medium using one or more communication protocols. The communication protocols may include, but are not limited to, IEEE 802.3 (Ethernet), IEEE 802.11, cellular 3G, cellular 5G, satellite, and the like. The network interface 310 may include one or more interface elements, such as antennas or physical interface connections. The network interface 310 may also include additional circuits, such as receiver and transmitter circuits that receive and transmit signals that are compliant with the communication protocol(s).

The controller 380 is configured to control various operations of the network device 300. The operations may include the transfer of signals and/or data between the elements in the network device 300 as well as managing the specific operations of those elements. The controller 380 may be formed using any known and suitable hardware, software, or a combination of hardware and software. For example, the controller 380 may be formed using dedicated hardware, such as an application specific integrated circuit (ASIC), or by a programmable processing unit, such as a Central Processing Unit (CPU), that is used to execute instructions or program code stored in storage unit 390.

Data processing engine 320 is configured to perform any computations or processing necessary for operations associated with the mathematical functions and data manipulation needed to implement aspects of the present disclosure. For example, the data processing engine 320 performs any preliminary processing or modification, such as data or feature extraction and data pruning of the data values received from the vehicles (e.g., vehicles 110*a*-110N) in FIG. 1). In some embodiments the extraction and data pruning may optimize and reduce data storage requirements by as much as 50 percent. Further, as a result of the extraction and data pruning, as much as 97 percent of irrelevant data can be discarded, leaving only the most important data, as little as 3 percent of the total amount of data values received, for further processing.

In addition, the data processing engine 320 may monitor the type and/or quality of some or all of the current data values and put constraints on the range of values for the data. The constraints may be provided as threshold values from an external database associated with the vehicles (e.g., external vehicle database 150 in FIG. 1). The values in the sets of data may be normalized or scaled as to type and value range based on any processing requirements set by the machine learning algorithms in the ANN engine. Further, the sets of data values may be reviewed through various correlation algorithms to remove outlier values from the data. For example, a correlation algorithm may review the data values through statistical concepts, such as z-score, Inter-quartile range (IQR), and the like, to detect an outlier value. In some cases, an outlier can also be detected and/or removed using other techniques. It is worth noting that the distribution of the values in the sets of data may be adjusted by data processing engine 320 based on the machine learning algorithm. The data processing engine 320 may be formed using any known and suitable hardware, software, or a combination of hardware and software. For example, the data processing engine 320 may be formed using dedicated hardware, such as an ASIC, or by a programmable math or graphical processing unit (GPU), that is used to execute instructions or program code stored in storage unit 390.

The ANN engine 330 is structured in a manner similar to that described above, having a number of ANNs configured to perform machine learning algorithms, the configuration and/or execution code for which may be stored as part of ANN engine 330 or in storage unit 390. The ANN engine 330 may be formed using suitable hardware for constructing the ANNs. In some embodiments, the ANN engine 330 may encompass a plurality of dedicated hardware elements, such as ASICS, that are interconnected using a specialized communication bus. In some embodiments, a portion of the ANN engine 330 may be formed using programmable GPUs or CPUs that execute instructions or program code stored either in the ANN engine 330 or storage unit 390.

The storage unit 390 stores various data, including current and/or past data values and is used as part of computations performed by the data processing engine 320, ANN engine 330, and controller 380. The storage unit 390 also has at least one program as well as any additional program code needed for execution in any of the data processing engine 320, ANN engine 330, and controller 380. For example, storage unit 390 may store program code needed for executing the machine learning algorithms used in the ANN engine 330. Storage unit 390 may also store intermediate data of computations performed by the data processing engine 320, ANN engine 330, and controller 380, as well as results or data used by other elements internal or external to the network device 300. The storage unit 390 may include any suitable storage elements or means capable of storing any programs, data, and the like in a computer-readable manner. Examples of elements that may comprise the storage unit include non-transitory computer-readable storage media such as semiconductor memory devices, and magnetic, optical, or magneto-optical recording medialoaded into a read and write unit. The semiconductor memory devices may include but are not limited to, RAM, ROM, Electrically-Erasable Programmable ROM (EEPROM), and flash memory.

The input interface 330 may include circuitry and physical interface components for one or more input elements that may be used by a user for entering data and/or control the operation of the cloud processing device. The one or more input elements include, but are not limited to a keyboard, a mouse, a trackball, microphone, a touch panel, and the like. The output interface 340 may include circuitry and physical interface components for one or more output elements that may be used by a user to retrieve and consume information received and/or processed by the network device 300. The one or more output elements include, but are not limited to, a display unit, a speaker, a vibratory unit, and the like. In some embodiments, the input interface 330 and output interface 340 may share a common physical interface allowing external devices having both input and output capabilities to interface to the network device 300. The external devices include, but are not limited to, a cell phone, a tablet computer, a laptop computer, and the like. As shown in FIG. 1, a user device (e.g., user device 140) may interface with the network device 300 through one or both of the input interface 330 and the output interface 340 or may interface over the network through the network interface 310.

In operation, the network interface 310 receives a set of current data values for two or more vehicles that are organized as a group of vehicles or a vehicle fleet. The data values are generated by a set of sensors included on the vehicles (e.g., sensors 230-244 in FIG. 2). The network interface 310 further retrieves data external to the two or more vehicles from a database (e.g., external vehicle database 150 in FIG. 1). The ANN engine 330 processes the set of current data values and the received external data for the one or more vehicles using at least two machine learning algorithms to identify a set of selected data values, or features. The features are selected based on the current operation of the one or more vehicles. In some embodiments, the current set of data values may be processed in data engine 320 prior to processing in the ANN 330 as described above.

The ANN engine 330 further processes the set of features, using a first machine learning algorithm selected from the at least two machine learning algorithms used as part of the previous processing to select features, to generate a current predicted efficiency value for the two or more vehicles. The ANN engine 330 additionally processes the current predicted efficiency value for the two or more vehicles, using a second machine learning algorithm, to generate at least one future predicted efficiency value for each of the two or more vehicles at a future point in time. It is worth noting that past sets of data values from the vehicles, as well as past data external to the vehicles retrieved from the external database, that are provided through network interface 310 may be included and used as part of the processing performed in the machine learning algorithms, such as for training as described above.

The current predicted efficiency value and the at least one future predicted efficiency value for each of the two or more vehicles are provided to the data processing engine 320. The data processing engine 320 determines if one of the current predicted efficiency values and the at least one future predicted efficiency value of a first vehicle from the two or more vehicles is less than a corresponding predicted efficiency value for a second vehicle from the two or more vehicles. The data processing engine 320 further compares one or more operational characteristics of the second vehicle and the first vehicle if it is determined that the predicted efficiency value (either current or future) is less than the corresponding predicted efficiency value.

In some embodiments, the operational characteristics may include harsh or rapid vehicle acceleration, vehicle operation idle time, or sudden or rapid vehicle braking.

A notification message is generated and provided through the network interface 210 and/or the output interface 340 based on the comparison in the data processing engine. The notification message includes information to improve the efficiency of the first vehicle from the two or more vehicles. In some embodiments, the efficiency improvement may include modifying one or more of the driving characteristics for the vehicle. Further, in some embodiments, the notification message may include an improvement based on modifying the driving the vehicle, adjusting a travel route for the vehicle, and/or identifying maintenance for the vehicle. For example, the driving of the vehicle may be modified by adjusting the speed of the vehicle automatically through control code or electronic instructions sent to the vehicle over a network as described above.

Figure 4:
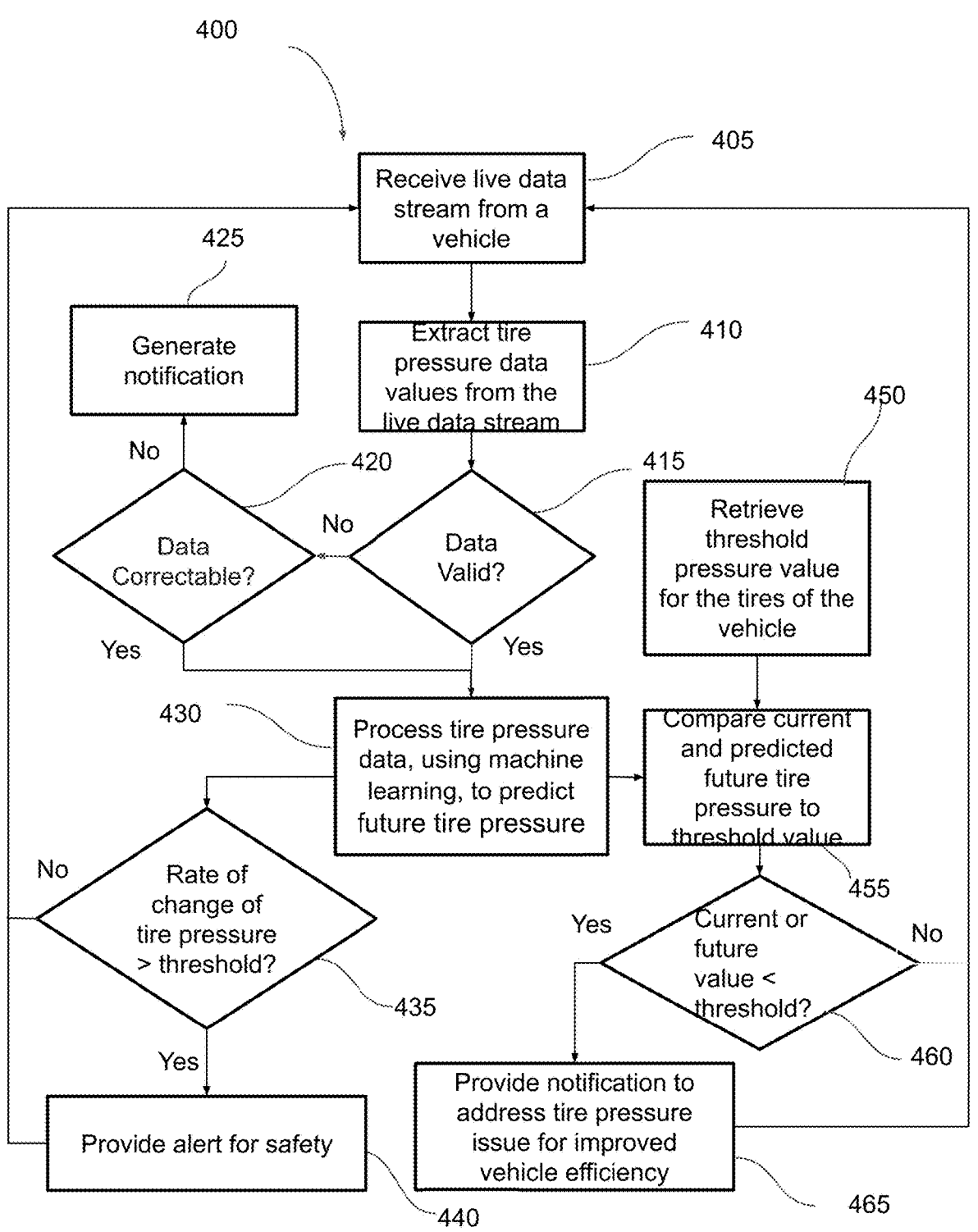
FIG. 4 is a flow chart of an exemplary process for determining and providing recommendations and notifications associated with tire pressure data from a vehicle in a vehicle fleet to which the principles of the present disclosure are applicable.

Turning to FIG. 4, a flow chart of an exemplary process 400 for detemiining and providing recommendations and notifications associated with tire pressure data from a vehicle in a vehicle fleet according to aspects of the present disclosure is shown. Process 400 is primarily described as part of use and operation in a system similar to system 100 described in FIG. 1. Further, one or more of the steps in the process can be performed in a vehicle similar to motor vehicle 200 described in FIG. 2 and/or in a network device similar to that described in FIG. 3. Although process 400 depicts steps performed in a particular order for purposes of illustration and discussion, the operations discussed herein may not be limited to any particular order or arrangement. One skilled in the art, using the description of the present embodiments herein, will recognize that one or more of the steps of process 400 may be omitted, rearranged, combined, and/or adapted in various ways.

At step 405, alive data stream containing data values for one or more sensors included on a vehicle (e.g., motor vehicle 200 in FIG. 2) in a vehicle fleet is received by network interface 310. The data values from the live data stream may be received by the network interface 310 at a periodic rate, such as four times per second. At step 410, the tire pressure data values present in the live data stream received, at step 405, are identified and extracted from the remaining data values. The identification of the tire pressure data values may be done based on a data header included with the data value or through identification of the formatting of the data, such as described above. Typically, the tire pressure data values are generated by tire pressure monitor system (TPMS) sensors in the wheels of the vehicle (e.g., sensors 241a-241d in FIG. 2).

At step 415, a determination is made as to whether the tire pressure data values extracted, at step 410, are valid values in the data processing engine 320. The determination may be made based on a data value size or range for the tire pressure data values. Alternatively, the determination may be made based on evaluating using an expected tire pressure data value range based on extrinsic data, as will be described below. If at step 415, the determination is made that the data is not valid, then, at step 420, a determination is made as to whether the data is correctable in the data processing engine 320. The ability to correct data relies primarily on statistical techniques such as correlation algorithms described above. It is worth noting that the sets of data values that are not valid and the sets of data values that are correctable are different. For example, data values that are random, non-stationary and aperiodic may easily be corrected using the mentioned techniques. Data values that are not valid for periods of time are likely also not correctable. As such, the goal of the determinations at steps 415 and 420 is to provide correct and reliable data values for further processing.

If, at step 420, the determination is made that the tire pressure data values are not correctable, then, at step 425, a notification is generated to indicate that something is not working property with respect to the creation or communication of the tire pressure data values. The notification that the vehicle needs service for the sensors that produce the tire pressure data values. The notification may be provided to the operator of the service or to the owner, operator, or controller of the vehicle through the network interface 310 over a network (e.g., network 120 in FIG. 1). The notification may further be provided to a manufacturer, government agency, or anyone with the authority to address the error or issue with the sensor.

If at step 415 the determination is made that the tire pressure data values are valid or, at step 420, the determination is made that the tire pressure data is correctable, then at step 430, the tire pressure data values are processed, using a machine learning algorithm, to generate predicted future tire pressure values in the ANN engine 330. The machine learning algorithm used may be one of several time series forecasting type algorithms, such as a modified linear regression algorithm, a dynamic linear regression algorithm, an ARIMA algorithm or others. The predicted future tire pressure values may be generated at a periodic basis similar to that described above. It is worth noting that more than one predicted future tire pressure value may be generated, extending further out in time from the current time. For example, the predicted future tire pressure values may be generated for a time period of 30 minutes in the future. As such, the accuracy of these future predicted tire pressure values declines the further in the future the time period is extended.

At step 435, using the current tire pressure data values as well as the predicted tire pressure values generated at step 430, a determination is made as to whether the rate of change of tire pressure for either the current tire pressure data values or one of the predicted tire pressure values for one or more of the tires exceeds a threshold values for the rate of change of tire pressure. Such a condition is likely caused by failure of the tire, now or in the future. If, at step 435, the determination is made that the rate of change of the of the tire pressure for either the current tire pressure data values or one of the predicted tire pressure values exceeds a threshold values for the rate of change of tire pressure, then, at step 440, a safety alert is generated. The safety alert includes an indication of a tire failure. The safety alert may also indicate a time, including a time in the future, when the tire failure is expected to occur. In some embodiments, the safety alert may include an indication in miles for when the tire failure is expected to occur based on additional data values from the vehicle indicating the speed of the vehicle. The safety alert may be provided to the service provider, or to the owner over the network. The safety alert may also be provided to the operator of the vehicle over the network. In some embodiments, the safety alert may include operable instructions that can be executed by the vehicle in order to take action before the failure of the tire occurs, as described above. After step 435, process 400 returns to step 405 to continue receiving the live data stream from the vehicle.

If, at step 435, the determination is made that the rate of change of tire pressure value has not exceeded the threshold value, process 400 returns to step 405 to continue receiving the live data stream from the vehicle.

At step 450, a set of threshold tire pressure values for the tires used on the vehicle providing the live data stream, at step 405, is received by the network interface 310. The vehicle may be identified by a specific vehicle identification number included as a data value in the live data stream. The specific vehicle identification number may be provided as a request to an external database (e.g., external vehicle database 150 in FIG. 1) through a network (e.g., network 120). In some cases, the threshold value for one or more of the tires may be different from the other tires. For example, the threshold for the front tire and rear tires may be different. Additionally, the threshold values may be different for different types or even models of vehicles. In some embodiments, other information about the vehicle, such as the expected range of tire pressures for the tires described above, may also be retrieved from the external database.

At step 455, the current tire pressure values, extracted at step 410, and the future tire pressures, generated at step 430 are compared to the threshold values retrieved at step 450. If, at step 460, the comparison, at step 450, indicates that the current tire pressure value or one of the predicted future tire pressure values is below the threshold value for one or more of the tires, then, at step 465, a notification is generated. The notification provides a recommendation to address the low tire pressure issue to improve operational efficiency of the vehicle. The notification may also indicate either a time or a mileage at which the tire pressure value is expected to be below the threshold value in a manner similar to that described above. The notification may be provided to the service provider or owner or to the operator of the vehicle as described above. process 400 returns to step 405 and receiving a live data stream from a vehicle.

If, at step 460, the comparison, at step 450, indicates that the current tire pressure values or one of the predicted future tire pressure values is not below the threshold value, then process 400 to continue receiving the live data stream from the vehicle.

Figure 5:
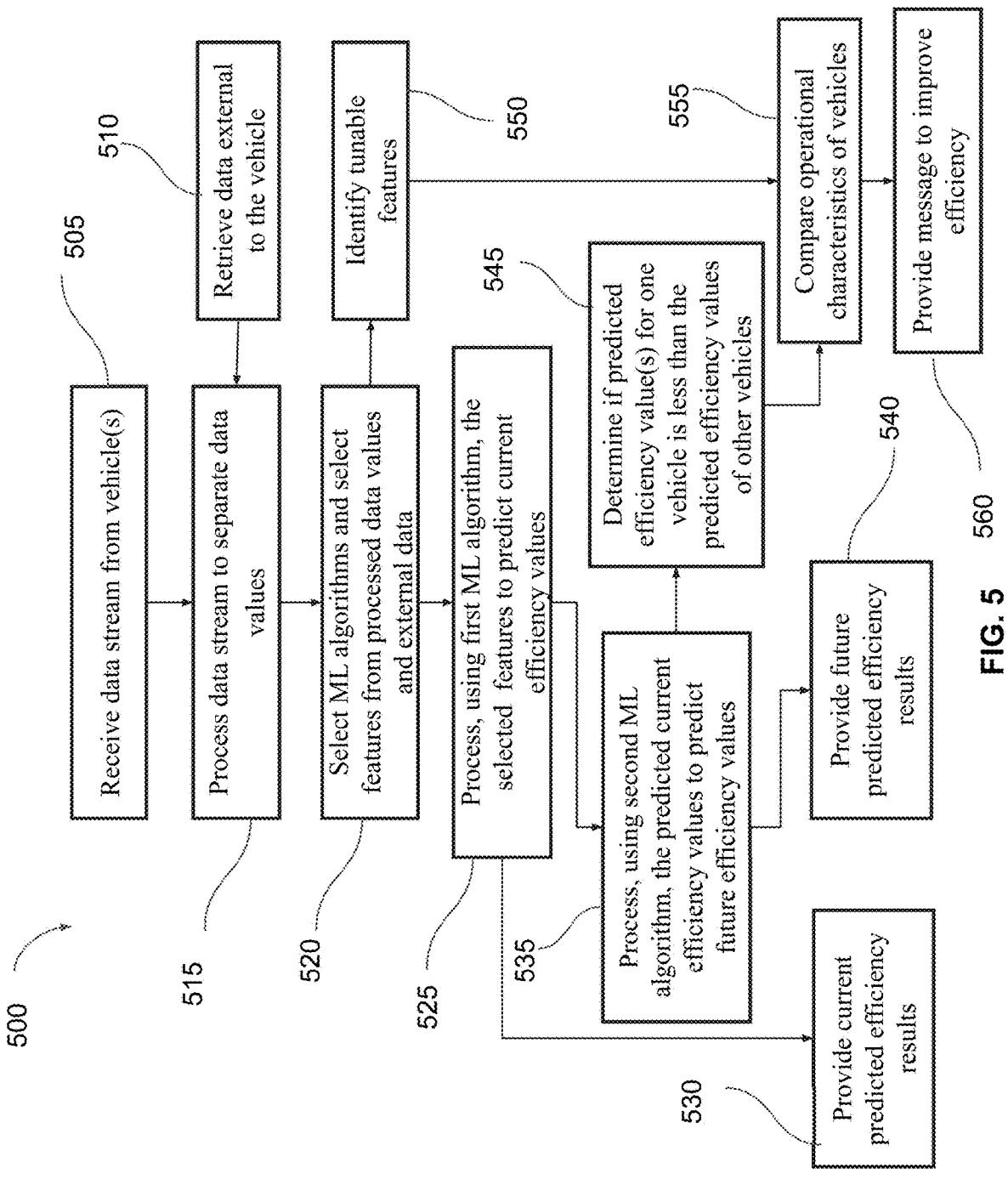
FIG. 5 is a flow chart of an exemplary process to determine and provide notifications associated with operational efficiency based on sensor data and external data for a set of vehicles in a vehicle fleet to which the principles of the present disclosure are applicable.

Turning to FIG. 5, a flow chart of an exemplary process 500 to determine and provide notifications associated with operational efficiency based on sensor data and external data for a set of vehicles in a vehicle fleet according to aspects of the present disclosure is shown. Process 500 is primarily described as part of use and operation in a system similar to system 100 described in FIG. 1. Further, one or more of the steps in process 300 can be performed in a vehicle similar to that described in FIG. 2 and/or in a network device similar to that described in FIG. 3. Although process 400 depicts steps performed in a particular order for purposes of illustration and discussion, the operations discussed herein may not be limited to any particular order or arrangement. One skilled in the art, using the description of the present embodiments herein, will recognize that one or more of the steps of process 500 may be omitted, rearranged, combined, and/or adapted in various ways.

At step 505, a data stream containing data values for one or more sensors included on a fleet of vehicles (e.g., vehicles 110a-110N) is received at network interface 310. The data values from the data stream may be received by the network interface 310 at a periodic rate, such as four times per second. In some embodiments, all the available data values from the vehicle are received. For example, data values from as many as 176 sensors may be received. In some embodiments, the data values may be received on a periodic basis, as described above. Additionally, at step 510, additional data external to the vehicle is also received at network interface 310. The additional data may include geographical location data, weather or environmental conditions and forecasts at the location of the vehicle, time of day and time of year at the location of the vehicle, type of vehicle, age of the vehicle, maintenance schedule for the vehicle, as described above.

At step 515, data stream is processed in data processing engine 320 to separate and, if necessary, extract certain data values. Further, the processing, at step 515, may include data pruning, type and quality monitoring of the data, and scaling and normalization of the data as described earlier. At step 520, one or more machine learning algorithms configured in the ANN engine 330 may be used to select a set of data values as types of data identified and referred to as features, from the data values processed, at step 515 and the retrieved data values, at step 515. These selected features represent the data values or combinations of data values that have the highest likelihood of affecting operational efficiency. The machine learning algorithms used, at step 520 are, in most cases, real-time multivariate machine learning algorithms. Examples of real-time multi-variate machine learning algorithms include, but are not limited to, multivariate adaptive regression splines (MARS) algorithms, K-nearest neighbors algorithms, decision-tree algorithms, random forests algorithms, K-means clustering algorithms, and the like. In some embodiments, the selected features may be identified from the set of data values based on a real time adjustability factor generated by the one or more machine learning algorithms. For example, the top 10 data values may be selected as features based on the highest adjustability factor for those data values. In some embodiments, more than one machine learning algorithm may be used initially in order to evaluate and select the best machine learning algorithm. The evaluation may be performance based. Information regarding the selection of the machine learning algorithm and the selection of features will be described in further detail below. In some embodiments, the machine learning algorithm may be selected by the user or service provider based on, for instance, knowledge or experience.

At step 525, the features, selected at step 520, are processed using the machine learning algorithm in ANN 330, also selected at step 520, to predict current efficiency values for each of the vehicles in the vehicle fleet. In some embodiments, the current predicted efficiency value for each of the vehicles may include one or both of a current predicted fuel efficiency value and a current predicted battery efficiency value.

At step 530, the current predicted efficiency values for each of the vehicles is provided for display through the output interface 340 or for use with other devices external to network device 300 through network interface 310, such as a user device (e.g., user device 140 in FIG. 1) over a network (e.g., network 120). In some embodiments, the current predicted efficiency values for a specific vehicle (e.g., motor vehicle 200) may be provided and displayed to the operator of that vehicle through the network (e.g., using operator AN interface 250).

At step 535, the current predicted efficiency results, at step 525, are provided and used by a second machine learning algorithm in ANN 330 to predict one or more future values for efficiency for each of the vehicles. In some embodiments, the one or more future predicted efficiency values, referred to as a set of predicted future values, for each of the vehicles may include one or both of a set of future predicted fuel efficiency values and a set of future predicted battery efficiency values. In some embodiments, the machine learning algorithm used to predict future efficiency values may be different from the machine learning algorithm used to predict the current efficiency value at step 525. For example, the machine learning algorithm used to predict the set of future efficiency values may be one of several time series forecasting type algorithms, as described above. In some embodiments, the set of predicted future efficiency values may be generated at a periodic basis similar to that described above. It is worth noting that more than one predicted future tire pressure value may be generated, extending further out in time from the current time, such as 30 minutes, as described above. At step 540, the set of future predicted efficiency values for each of the vehicles is provided for display through the output interface 340 or for use with other devices external to network device 300 through network interface 310 as described above. In some embodiments, the set of future predicted efficiency values for a specific vehicle (e.g., motor vehicle 200) may be provided to the operator as described.

At step 545, a determination is made using the data processing engine 320 as to whether the current predicted efficiency value for a vehicle in the fleet of vehicles is less than the current predicted efficiency value for any other vehicle in the fleet of vehicles or whether one of the set of future predicted efficiency values for the same vehicle in the fleet of vehicles is less than the corresponding one of the set of future predicted efficiency values for any vehicle in the fleet of highest current predicted efficiency value for any other vehicle in the fleet of vehicles. In other words, the determination may check both the current predicted efficiency values and the set of future predicted efficiency values for one vehicle in the vehicle fleet against any other vehicle in the vehicle fleet having a higher corresponding predicted efficiency value.

At step 550, the set of features selected, at step 520 are further evaluated using the data processing engine 320 and/or the ANN engine 330, applying the machine learning algorithm used at steps 529 and 525, to identify a subset of tunable features based on the type of operational characteristics that are associated with each feature. As an example, one feature in the set of features may be vehicle speed. The vehicle speed rate of change may be determined using the data values for vehicle speed from each vehicle. The rate of change of vehicle speed is evaluated to be tunable. Either the vehicle or the operator of the vehicle has control over the rate of change of vehicle speed, changing the vehicle speed slowly or quickly depending on driving characteristics. Other features can be evaluated in a similar manner. The subset of tunable features provides the likely improvement areas for efficiency.

At step 555, the operational characteristics of the one vehicle in the fleet of vehicles and the vehicle that has a higher current predicted efficiency value, or a higher future efficiency value are compared using the data processing engine 320 identified in the determination, at step 545. The comparison, at step 55, is made using the data values associated with each of the tunable features selected at step 550. For example, the comparison may involve comparing the features of vehicle speed, idle time and tire pressure for each of the vehicles.

In some embodiments, groups or subsets of vehicles in the vehicle fleet may be grouped or clustered based on efficiency values. For example, three groups of vehicles may be created and classified as low efficiency, average efficiency, and high efficiency. In this manner, the determination, at step 545, and comparison, step 555, may be done using a first vehicle in the low efficiency group and at least one second vehicle in the average efficiency group or high efficiency group. In some cases, the classification may be done on the basis of K-fold clustering results for the efficiency values. In some embodiments, the determination, at step 545, and the comparison, at step 555, may alternatively be carried out with respect to two vehicles within the same classification group. Further, the threshold or range for each group may be dynamically updated according to the performance of the vehicles in the particular group or subset. Further, in some embodiments, a vehicle from the fleet of vehicles or a particular group of vehicles, as described, above may be identified that has a highest current predicted efficiency value and/or a highest future predicted efficiency value at a point in time in the future. The operational characteristics of each of the remaining vehicles from the fleet of vehicles or the particular group of vehicles may be compared, at step 555, to that vehicle identified as having the highest efficiency.

At step 560, a message indicating changes to improve efficiency for the vehicle in the fleet of vehicles based on the comparison of operational characteristics, at step 555, is provided. The message is provided for display through the output interface 340 or for use with other devices external to network device 300 through network interface 310 as described above. In some embodiments, the message may be provided to the vehicle for use by the operator in a manner similar to that described above.

In some embodiments, the message may indicate different types of changes to improve efficiency. For example, the message may recommend adjusting the travel route, which may be based on data associated with geographical data or weather conditions. In another example, the message may recommend maintenance for the vehicle, such as adjusting the tire pressure based on evaluating the tire pressure as a feature in a manner similar to that described in FIG. 4 or external maintenance data and mileage or age for the vehicle. Other types of changes to improved efficiency may also be possible.

In some embodiments, the changes to improve efficiency includes modifying at least one driving characteristic of the vehicle. For example, the driving characteristic associated with rate of change of speed may be modified by recommending or implementing less harsh or rapid acceleration while driving. Similarly, the driving characteristic associated with braking to slow down or stop, based on either rate of change of speed or brake pedal pressure, may be modified by recommending or implementing less sudden braking, or decelerating without braking before applying braking. As another example, the driving characteristic associated with vehicle idle time, may be modified by recommending or implementing turning the vehicle off after a certain amount of vehicle idle time has passed.

It is worth noting that each vehicle in the fleet of vehicles is evaluated through steps 545 to 560 in a manner similar to that described above. As such, the vehicle with the highest current predicted efficiency value or the highest corresponding one of the sets of future predicted efficiency values may be referred to as the target vehicle for that efficiency point. Further, although not shown, the process is iterative in a manner similar to that described above for process 400 in FIG. 4.

In some embodiments, the fleet of vehicles may be further separated into groups of vehicles based on certain external characteristics, such as vehicle type or the age of vehicle. In these embodiments, the steps of process 500 may be duplicated using separate and/or different machine learning algorithms and selected features for each of the groups. The use of grouping similar vehicles based on these certain characteristics further improves the performance of the machine learning algorithms, ultimately producing more refined recommendations to improve efficiency and potentially resulting in higher operational efficiency values.

In some embodiments, the current predicted efficiency value as well as the set of future predicted efficiency values may be associated with a different efficiency outcome target for the machine learning algorithms than the operational efficiency outcome target described above. For example, a company that delivers packages may be interested in improved package delivery efficiency rather than fuel, or battery efficiency. The different target outcome may change one or more aspects of the process, such as the selection of features and the types of messages to improve delivery efficiency but change in target outcome does not change the steps of the process as described in FIG. 5.

It is worth noting that the current predicted efficiency values and the sets of future predicted efficiency values may be dynamic, meaning the value boundaries may change over time. Further, the selection of features from the data values and external data, as well as the identification of tunable features from the selected features, as described above may also be dynamic. In this manner, the processing described above is capable of automatically and dynamically adapting in real-time to changes in operational characteristics, geographical impacts, weather changes, seasonal changes, and the like.

Figure 6:
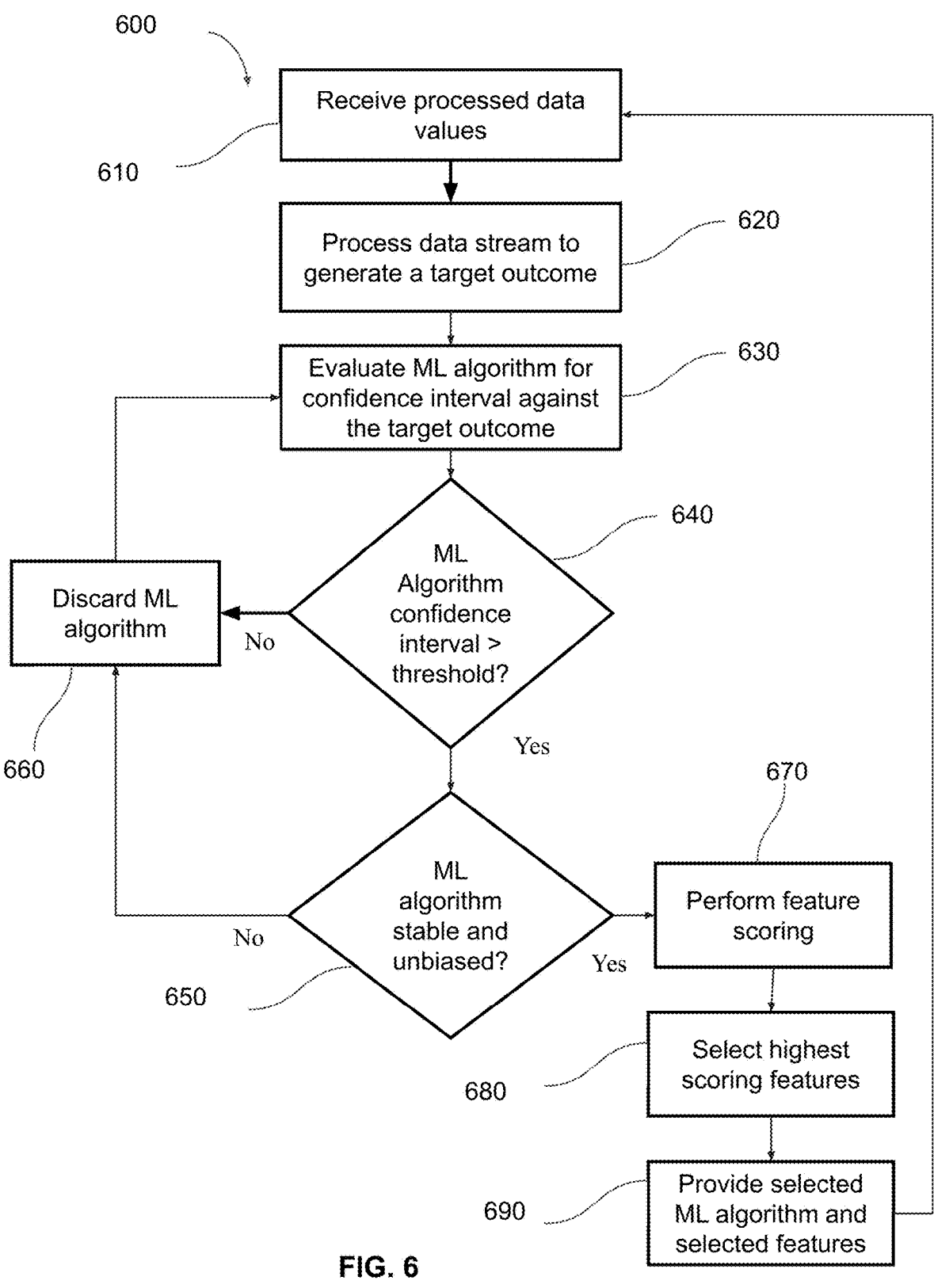
FIG. 6 is a flow chart of an exemplary process for selecting features from a set of data values provided from a fleet of vehicles to which the principles of the present disclosure are applicable.

Turning to FIG. 6, a flow chart of an exemplary process 600 for selecting features from a set of data values provided from a fleet of motor vehicles, according to aspects of the present disclosure is shown. Process 600 is primarily described as part of a network device, such as network device 300 described in FIG. 3. Process 500 may also be used as part of the operation of a system, such as cloud processing device 130 in system 100 described in FIG. 1. Further, one or more of the steps in process 600 can be performed in a vehicle similar to that described in FIG. 2 and/or in a processing device similar to that described in FIG. 3. Additionally, process 600 may be used in conjunction with another process for generating predictive outcomes and providing recommendations for improving operational efficiency of vehicles. More specifically, process 600 describes the steps performed to implement the selections of a machine learning algorithm and/or the selection of features from data values described at step 520 in process 500. Although process 600 depicts steps performed in a particular order for purposes of illustration and discussion, the operations discussed herein may not be limited to any particular order or arrangement. One skilled in the art, using the description of the present embodiments herein, will recognize that one or more of the steps of process 600 may be omitted, rearranged, combined, and/or adapted in various ways.

At step 610, processed data values from the data processing engine 320 (e.g., the processed data values generated at step 515 in FIG. 5) are received at the ANN engine 330. At step 620, the received data values are processed to generate a target outcome. For example, the target outcome may be operational efficiency of a vehicle.

At step 630, one of the sets of possible or available machine learning algorithms is evaluated for accuracy against the target outcome based on a threshold confidence interval in the ANN engine 330. At step 640, a determination is made as to whether the evaluation of the machine algorithm at step 630 has reached a confidence interval greater than a threshold value. In some embodiments, the threshold value for the confidence interval may be 95%. In other embodiments, different thresholds may be used. If, at step 640, the determination is made that the confidence level for the machine learning algorithm being evaluated does not exceed the threshold, then, at step 660, the machine learning algorithm is discarded and process 600 returns to step 630, to evaluate another of the available or possible machine learning algorithms.

If, at step 640, the determination is made that the confidence interval for the machine learning algorithm under evaluation exceeds the threshold value, then, at step 650, a determination is made as to whether the machine learning algorithm under evaluation is stable and unbiased.

If at step 650, the determination is made that the machine learning algorithm under evaluation is not stable and unbiased, then, at step 660, the machine learning algorithm is discarded and process 600 returns to step 630, to evaluate another of the available or possible machine learning algorithms.

If at step 650, the determination is made that the machine algorithm is stable and unbiased, then the ML algorithm is selected for use for predicting current efficiency values. At step 670, each of the processed data values are scored using the selected machine learning algorithm, at step 650, in ANN engine 330. The scoring involves using a real time adjustability factor to identify how the data values contribute to the target outcome of the operational efficiency value. Each of the data values receives a score, with the higher the score, the larger the contribution.

At step 680, a subset of the data values identified having the highest scores are selected as the set of features. The number of features that are selected may vary based on the target outcome as well as other factors such as processing time and accuracy. In some embodiments, ten features may be selected. At step 690, the subset of data values, selected as the set of features, at step 680, is provided for further processing using the selected ML algorithm (e.g., step 535 in FIG. 5).

Figure 7:
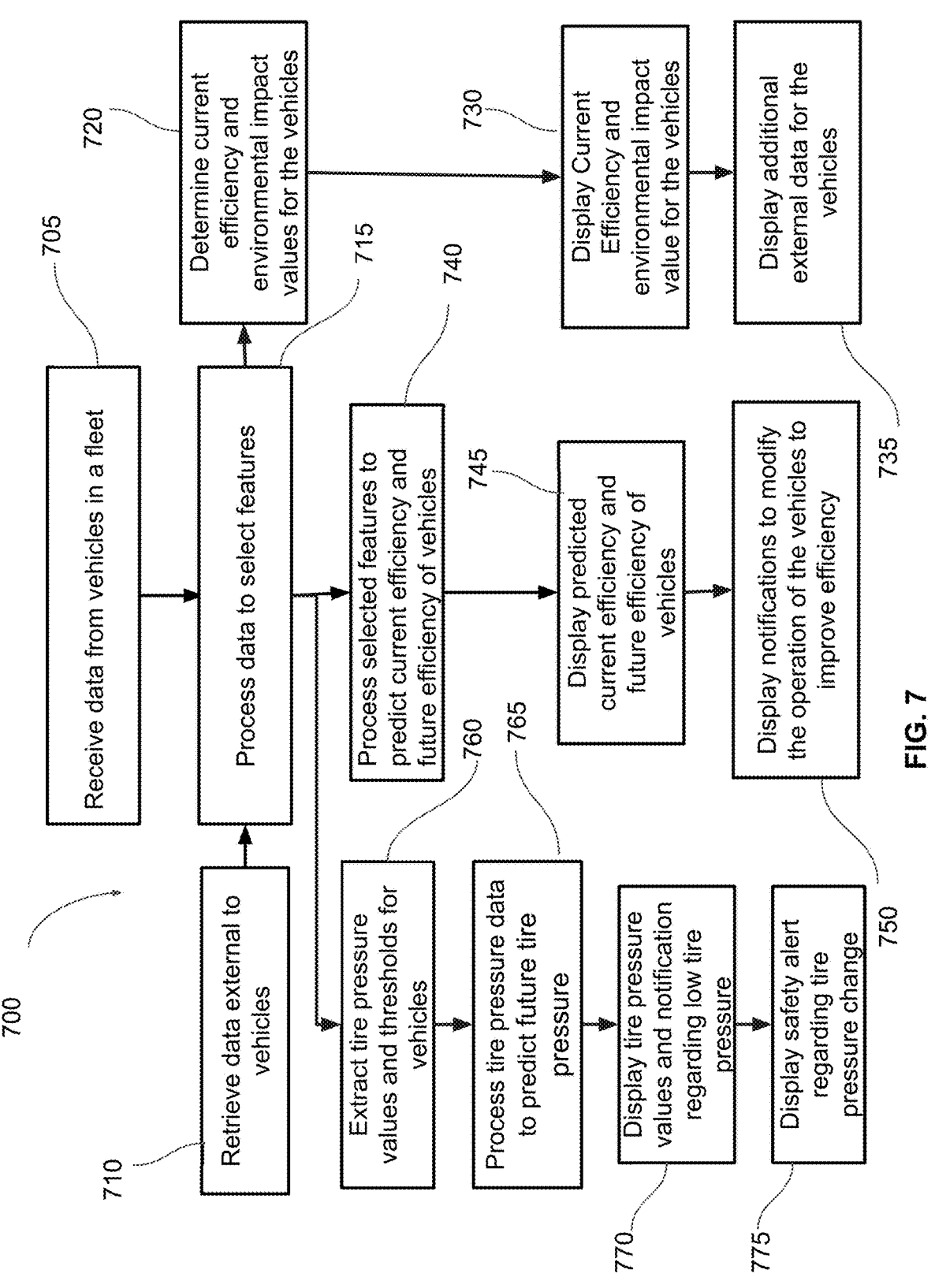
FIG. 7 is a flow chart of an exemplary process for generating and displaying data analytics associated with operational efficiency for a set of vehicles in a vehicle fleet to which the principles of the present disclosure are applicable.

Turning to FIG. 7, a flow chart of an exemplary process 700 for generating and displaying data analytics associated with operational efficiency for a set of vehicles in a vehicle fleet, according to aspects of the present disclosure is shown. Process 700 may also be used as part of the operation of a system, such as cloud processing device 130 and/or user device 140 in system 100 described in FIG. 1. Further, one or more of the steps in process 700 can be performed in a vehicle similar to that described in FIG. 2 and/or in a network processing device similar to that described in FIG. 3. Although process 700 depicts steps performed in a particular order for purposes of illustration and discussion, the operations discussed herein may not be limited to any particular order or arrangement. One skilled in the art, using the description of the present embodiments herein, will recognize that one or more of the steps of process 700 may be omitted, rearranged, combined, and/or adapted in various ways. Further, it is worth noting that several steps described in process 700 have been previously described in other processes above. As such, except as described here, those steps will not be further described here for purposes of conciseness.

At step 705, data is received from vehicles in a fleet in a manner similar to that described at step 405 in FIG. 4 or step 505 in FIG. 5. The data may be received by a cloud processing device (e.g., cloud processing device 130 in FIG. 1) or a network device (e.g., network device 300 in FIG. 3) as described above. At step 710, data external to the vehicles in the fleet of vehicles is retrieved from a vehicle information database in a manner similar to step 450 in FIG. 4 or step 510 in FIG. 5. The external data for the vehicles may be retrieved from external vehicle database 150 in FIG. 1 in a manner as described above. At step 715, the data values received at step 705 along with the data external to the vehicles retrieved at step 710 are processed to select a set of features in a manner similar to step 520 in FIG. 5. In some embodiments, the processing, at step 715, may include separating the data values in a manner similar to step 515 in FIG. 5. Further in some embodiments, the processing, at step 715, may include validity and/or quality checking of the data values in a manner similar to steps 414-425 in FIG. 4. Additionally, in some embodiments, the processing, at step 715, may include one or more of the steps described as part of a process for selecting features from a set of data values provided from a fleet of motor vehicles in FIG. 6. In some embodiments, the processing, at step 715 may further include identifying and selecting a subset of the features that are tunable in a manner similar to step 550 in FIG. 5.

At step 720, a current or actual, efficiency value, along with an environmental impact value, are determined or computed for each of the vehicles in the fleet of vehicles. In some embodiments, the current efficiency is computed as a fuel efficiency equal to the number of miles traveled per gallon. In some embodiments, the current efficiency value may further include a computation to determine a cost per mile traveled value, using the fuel efficiency value and the cost for each gallon of fuel (e.g., gasoline). In some embodiments, similar determinations can be made for different or alternative fuel powered vehicles or battery energy powered vehicles. The environmental impact value may be determined based on carbon dioxide emissions for a fuel energy powered vehicle or equivalent carbon dioxide emissions for the generation of electricity for a battery energy powered vehicle. The environmental impact value may also include a representative carbon footprint value based on the carbon dioxide emissions. At step 730, the efficiency values and environmental impact values for the vehicles in the fleet of vehicles are provided for display. The efficiency values and environmental values may be displayed as part of a screen in a GUI. The GUI may be displayed on a user device (e.g., user device 140 in FIG. 1) and/or as part of an external display device couple to a cloud processing device (e.g., cloud processing device 130) or a network device (e.g., network device 300 in FIG. 3). In some embodiments, efficiency values and environmental values may be displayed to an operator of a vehicle in the fleet of vehicles using an A/V interface (e.g., operator A/V interface 250 in FIG. 2). In some embodiments, the efficiency value and environmental value for each of the vehicles may be displayed. In some embodiments, an aggregate efficiency value and aggregate environmental impact value for the fleet of vehicles or subset of the fleet of vehicles may be displayed. It is worth noting that the display screen in the GUI that contains the efficiency value and environmental value may also include additional information about the vehicles in the fleet and associated with those values as described above. As such, this display screen may be referred to as "FuelNet".

At step 735, one or more elements of the additional external data for one or more of the vehicles in the fleet of vehicles may be provided for display. Examples of elements of the additional external data that may be displayed include, but are not limited to, geographical or topological maps, current and forecasted weather information, routing schedules, and the like. The additional external information may be displayed as part of a screen in the same GUI, either for individual vehicles or for an aggregated set or subset of vehicles, on a number of possible display devices as described above.

At step 740, the set of features selected at step 740, are processed to predict current efficiency values and sets of future efficiency for the vehicles in the fleet of vehicles in a manner similar to steps 525 and 535 in FIG. 5. In some embodiments, the processing, at step 740, may include determining if one of the collective predicted efficiency values for one of the vehicles is less than the corresponding predicted efficiency value for any other vehicle in the fleet of vehicles in a manner similar to step 545 in FIG. 5. The processing, at step 740, may further include comparing the operational characteristics of the two vehicles used as part of the determination using the data values associated with one or more of the features from the set of features selected at step 715. In some embodiments, the features used in the comparison may be tunable features.

At step 745, the predicted current efficiency values and the sets of predicted future efficiency values for the vehicles in the fleet of vehicles may be provided for display. Further, at step 750, a notification message including recommendations to modify the operation of the vehicles in the fleet of vehicles in order to improve efficiency is also provided for display. The predicted current efficiency values and the sets of predicted future efficiency values, along with the notification message, may be displayed as part of a screen in the same GUI, either for individual vehicles or for an aggregated set or subset of vehicles, on a number of possible display devices as described above. In some embodiments, the predicted current efficiency values and the sets of predicted future efficiency values may be predicted fuel efficiency values and/or predicted battery efficiency values. In some embodiments, the notification message may include a recommendation to modify one or more driving characteristics as described above. Further, in some embodiments, the notification may include program code or instructions that can be downloaded into the vehicle for automatically adjusting the operation of the vehicle in order to improve efficiency. It is worth noting that the display of a notification message, at step 750, may not apply to each vehicle in the fleet of vehicles at any point in time. As such, step 750 may be considered optional for one or more vehicles at points in time.

It is worth noting that the display screen that includes the predicted efficiency values as well as the notifications for improving efficiency may also include additional information for the vehicles and associated with these display entries as described above. As such, this display screen may be referred to as "EcoNet".

At step 760, the tire pressure data values and threshold values for each of the vehicles in the fleet of vehicles are extracted from the processed data in a manner similar to steps 410 and 450 in FIG. 4. At step 765, tire pressure data values are processed to predict future tire pressure values for each of the vehicles in a manner similar to step 430 in FIG. 4. Additionally, at step 765, the tire pressure data values and the predicted tire pressure values for each of the vehicles are further processed to determine whether the rate of change in tire pressure is above a threshold in a manner similar to step 435 in FIG. 4. The tire pressure data values and the predicted tire pressure values also are processed to determine whether one or more of the tire pressure values is below a threshold value in a manner similar to steps 455 and 460 in FIG. 4

At step 770, the tire pressure values for each of the vehicles, along with a notification message regarding and tire pressure values that are or will be below the threshold value for each of the vehicles in the fleet of vehicles are provided for display. Further, at step 775, a safety alert regarding a high rate of change of tire pressure for one or more of the vehicles is provided for display. The tire pressure data values and notification message, along with the safety alert, may be displayed as part of a screen in the same GUI, either for individual vehicles or for an aggregated set or subset of vehicles, on a number of possible display devices as described above. The notification message may provide an indication for a time or distance at which the tire pressure value will be below the threshold as described above. Further, the safety alert message may include a time or distance at which the tire will fail or wi be out of air and what operational changes to make with the vehicle for safely operating the vehicle. In some embodiments, the predicted tire pressures for each of the vehicles may also be displayed. Further, in some embodiments, the safety alert message at step 775 may include program code or instructions that can be downloaded into the vehicle for automatically adjusting the operation of the vehicle as a matter of operational safety for the vehicle. It is worth noting that the display of a notification message, at step 770, and/or the safety alert, at step 775, may not apply to each vehicle in the fleet of vehicles at any point in time. As such, steps 770 and 775 may be considered optional for one or more vehicles at points in time.

It is also worth noting that the display screen that includes the tire pressure values as well as the notifications and safety alerts related to the tire pressures may also include additional information for the vehicles and associated with these display entries as described above. As such, this display screen may be referred to as "TireNet".

It is further worth noting that any of the values or notification listed for display in steps 730, 735, 745, 750, 770, and 775 may be optionally displayed through user control in the GUI, such as a selection button, a drop down menu, or a tab entry element.

Figure 8:
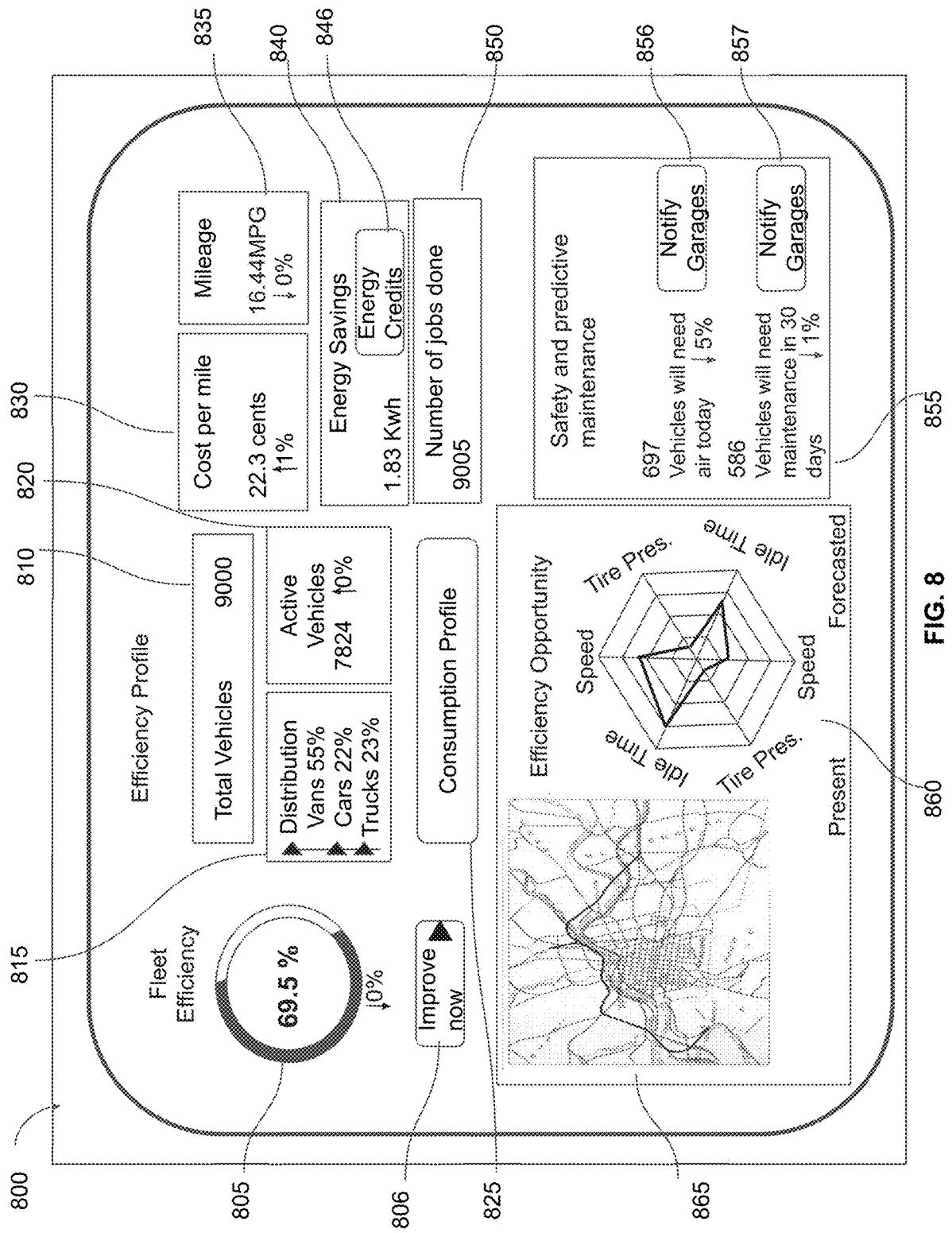
FIG. 8 is a screenshot of an exemplary display in a graphic user interface associated with providing data analytics for a set of vehicles in a vehicle fleet to which the principles of the present disclosure are applicable.

Turning now to FIG. 8, a screenshot of an exemplary display 800 in a GUI associated with providing data analytics for a set of vehicles in a vehicle fleet, according to aspects of the present disclosure is shown. Display 800 will be described in conjunction with process 700 described in FIG. 7. More specifically, display 800 includes a collection of elements described in FIG. 7 and combined on a single screen as aggregate values for the entire fleet of the vehicles. As such, display 800 may be referred to as "FleetNet". Further, display 800 may be provided for display on one or more display devices, such as user device 140 in FIG. 1, or an external display device coupled to an output interface in a network device (e.g., output interface 340 in FIG. 3).

Display 800 includes a section identified as the efficiency profile that includes a circle graph 805 displaying a fleet efficiency value, similar to that described at step 735 in FIG. 7. The circle graph 805 also includes a percent change indicator over a period of time, such as the time from the last displayed value. A selection button 806, labeled "Improve now" allows selectable display of the notifications described at step 750 in FIG. 7.

The efficiency profile section also includes a fleet characterization section, with a box for the total vehicles in the fleet 810, a box for the distribution of vehicles between three types 815, and a box for the total active vehicles 820. The box for the total active vehicles 820 also includes a percentage change indicator similar to above. The efficiency profile section further includes an efficiency characterization section, with a cost per mile box 830, a fuel mileage box 835, and an energy savings box 840 with values similar to those described above. The cost per mile box 830 and fuel mileage box also include percent change indicators as described above. The efficiency characterization section further includes a number of jobs done box 850 as an alternative input for an efficiency indicator. Further, the energy savings box includes a selection button 846, labeled "Energy Credits" Selecting this button displays a screen associated with how to generate, report, and/use energy credits based on environmental impact of the fleet of vehicles.

Display 800 further includes a safety and predictive maintenance section 855 that includes information for the number of vehicles that will need air to raise tire pressures today and the number of vehicles that will need maintenance in the next 30 days, along with percent change indicators as described above. Although not shown, the safety and preventative maintenance section 855 may also include a safety alert in place of, or in addition to, one of the entries above. Each of the entries include a selection button 856 and 857, labeled "Notify Garages". Selecting either one of these buttons automatically notifies a service station or garage to establish an appointment to address any issue with tires, maintenance, and/or safety issues. In some embodiments, an identifier of the vehicle for which the notification is being made, such as the vehicle identification number (VIN) may be included in the notification. In some embodiments, the service station or garage may have a contract with the owner, operator, or controller of the fleet of vehicles in order to assure timely corrective action can be taken.

Display 800 also includes a geographic map 865 similar to that described at step 735 in FIG. 7. The geographic map 865 may display the location of one or more of the vehicles in the fleet, either at the current time or over a range of time.

The indicator for each of the vehicles may also be color-coded as to type of vehicle or any individual characterization that may be available as part of a set-up screen for the GUI.

Display 800 additional includes an Efficiency Opportunity graph 860. The Efficiency Opportunity graph 860 utilizes a set of features used for processing the current predicted efficiency values and future predicted efficiency values as described above to produce a graphical representation of both present and forecasted, or future, efficiency improvements for each of the displayed features. The Efficiency Opportunity graph 860 is an evenly multi sided graph utilizing a set of axial lines extending to opposite corners between two adjacent sides and crossing at the center. Each of the axial lines represents a value of the efficiency improvement for a feature. One half of each axial line displays the present improvement value while the other half of the axial line displays the future improvement value. As such, the lower left half of Efficiency Opportunity graph 860 displays the present improvement values for the features vehicle speed, vehicle tire pressures, and vehicle idle and the upper right half of Efficiency Opportunity graph 860 displays the forecasted improvement values for the same. As shown, Efficiency Opportunity graph 860 displays three features on a hexagonal shaped graph. In other embodiments, other evenly multi sided graphs may be used (e.g., an octagon, decagon, etc.) accommodating the corresponding number of features in the graph.

It is to be appreciated that, except where explicitly indicated in the description above, the various features shown and described are interchangeable, that is, a feature shown in one embodiment may be incorporated into another embodiment.

Although embodiments which incorporate the teachings of the present disclosure have been shown and described in detail herein, those skilled in the art can readily devise many other varied embodiments that still incorporate these teachings. Having described preferred embodiments of an apparatus and method for processing data to improve operation of motor vehicles, it is noted that modifications and variations can be made by persons skilled in the art in light of the above teachings. It is therefore to be understood that changes may be made in the particular embodiments of the disclosure which are within the scope of the disclosure.

The invention claimed is:

1. A method comprising:

receiving a set of current data values for a group of vehicles over a network, the group of vehicles operating in unison as a vehicle fleet, each of the current data values being generated by at least one of the vehicles in the group of vehicles;

retrieving data external to the group of vehicles from at least one database;

processing the set of current data values and the received external data for the group of vehicles using a selected machine learning algorithm from a set of at least two machine learning algorithms to identify a subset of selected processed data values, the processing further including:

evaluating the processing of the set of current data values by each machine learning algorithm from the set of at least two machine learning algorithms for accuracy against a target vehicle operational outcome based on a threshold confidence interval;

determining if at least one of machine learning algorithms from the set of at least two machine learning algorithms is stable and unbiased if the accuracy of the at least one of machine learning algorithms against the target vehicle operational outcome exceeds the threshold confidence interval;

selecting one of the at least one machine learning algorithms as the selected machine learning algorithm to generate a score value for each of the processed set of current data values and received external data using a real time adjustability factor if it is determined that at least one of the machine learning algorithms is stable and unbiased, the real time adjustability factor identifying how each of the processed set of current data values and received external data contribute to the target vehicle operational outcome; and selecting a subset of the processed set of current data values and received external data having the highest score value;

processing the set of selected data values, using the selected machine learning algorithm, to generate a current expected efficiency value for each vehicle in the group of vehicles;

processing the current expected efficiency value for the group of vehicles, using a second machine learning algorithm, to generate at least one predicted efficiency value at a time in the future for each vehicle in the group of vehicles at a future point in time;

determining if one of the current expected efficiency value and the at least one predicted efficiency value at a time in the future for a first vehicle in the group of vehicles is less than one of the current expected efficiency value and the corresponding at least one predicted efficiency value at a time in the future for a second vehicle in the group of vehicles;

comparing at least one operational characteristic of the first vehicle and the second vehicle if it is determined that one of the current expected efficiency value and the at least one predicted efficiency value at a time in the future for the first vehicle is less than one of the current expected efficiency value and the corresponding at least one predicted efficiency value at a time in the future for the second vehicle; and providing a message in order to improve efficiency for the first vehicle in the group of vehicles based on the comparison.

2. The method of claim 1, wherein the current expected efficiency is at least one of current expected fuel efficiency and current expected battery efficiency and the at least one future predicted efficiency value at a time in the future is at least one of predicted fuel efficiency at a time in the future and predicted battery efficiency at a time in the future.

3. The method of claim 1, wherein the efficiency improvement includes at least one of modifying a driving characteristic of the first vehicle, adjusting a travel route of the first vehicle, and identifying maintenance for the first vehicle.

4. The method of claim 3, wherein the at least one operational characteristic of the first vehicle is at least one of vehicle acceleration, vehicle operation idle time, and sudden vehicle braking.

5. The method of claim 3, wherein the modifying of the driving of the first vehicle includes adjusting a speed of the first vehicle automatically by sending control instructions to the first vehicle over a network.

6. The method of claim 1, wherein providing the message includes providing the message to an operator of the at least one vehicle while driving the first vehicle.

7. The method of claim 1, wherein the selected machine learning algorithm is not the same as the second machine learning algorithm.

8. The method of claim 1, wherein the data external to the group of vehicles includes at least one of geographic location for a vehicle in the group of vehicles, vehicle type identification for a vehicle in the group of vehicles, age of a vehicle, and environmental conditions around a vehicle in the group of vehicles.

9. The method of claim 1, wherein the current set of data values are provided by a set of sensors included in each one of the vehicles in the group of vehicles.

10. A system comprising:

a data input element, the data input element receiving a set of current data values for a group of vehicles over a network, the group of vehicles operating in unison as a vehicle fleet, each of the current data values being generated by at least one of the vehicles in the group of vehicles, the data input element further retrieving data external to the group of vehicles from at least one database;

an artificial neural network engine coupled to the data input element, the artificial neural network engine processing the set of current data values and the received external data for the group of vehicles using a selected machine learning algorithm from a set of at least two machine learning algorithms to identify a subset of selected processed data values, the processing further including evaluating the processing of the set of current data values by each machine learning algorithm from the set of at least two machine learning algorithms for accuracy against a target vehicle operational outcome based on a threshold confidence interval, determining if at least one of machine learning algorithms from the set of at least two machine learning algorithms is stable and unbiased if the accuracy of the at least one of machine learning algorithms against the target vehicle operational outcome exceeds the threshold confidence interval, selecting one of the at least one machine learning algorithms as the selected machine learning algorithm to generate a score value for each of the processed set of current data values and received external data using a real time adjustability factor if it is determined that at least one of the machine learning algorithms is stable and unbiased, the real time adjustability factor identifying bow each of the processed set of current data values and received external data contribute to the target vehicle operational outcome, and selecting a subset of the processed set of current data values and received external data having the highest score value, the artificial neural network engine further processing the set of selected data values, using the selected machine learning algorithm, to generate a current expected efficiency value for each vehicle in the group of vehicles and processing the current predicted efficiency value for the group of vehicles, using a second machine learning algorithm, to generate at least one predicted efficiency value at a time in the future for each vehicle in the group of vehicles;

a data processing device coupled to the artificial neural network engine, the data processing device determining if one of the current expected efficiency value and the at least one predicted efficiency value at a time in the future for a first vehicle in the group of vehicles is less than one of the current expected efficiency value and the corresponding at least one future predicted efficiency value at a time in the future for a second vehicle in the group of vehicles and comparing at least one operational characteristic of the first vehicle and the second vehicle if it is determined that one of the current expected efficiency value and the at least one predicted efficiency value at a time in the future for the first vehicle is less than one of the current expected efficiency value and the corresponding at least one predicted efficiency value at a time in the future for the second vehicle; and a data output element coupled to the artificial neural network engine and the data processing device, the data output element providing a message in order to improve efficiency for the first vehicle based on the comparison.

11. The system of claim 10, wherein the current pe efficiency is at least one of current expected fuel efficiency and current expected battery efficiency and the at least one predicted efficiency value at a time in the future is at least one of predicted fuel efficiency at a time in the future and predicted battery efficiency at a time in the future.

12. The system of claim 10, wherein the efficiency improvement includes at least one of modifying a driving characteristic of the first vehicle, adjusting a travel route of the first vehicle, and identifying maintenance for the first vehicle.

13. The system of claim 12, wherein the at least one driving characteristic is at least one of vehicle acceleration, vehicle operation idle time, and vehicle braking.

14. The system of claim 12, wherein the data output element provides the message to an operator of the at least one vehicle while driving the first vehicle.

15. The system of claim 11, wherein the modifying of the driving of the first vehicle includes adjusting a speed of the first vehicle automatically by sending control instructions to the first vehicle over a network.

16. The system of claim 10, wherein the selected machine learning algorithm is not the same as the second machine learning algorithm.

* * * * *